US006623022B2

(12) United States Patent
Malassigne et al.

(10) Patent No.: US 6,623,022 B2
(45) Date of Patent: Sep. 23, 2003

(54) FOLDING COMMODE AND SHOWER WHEELCHAIR

(75) Inventors: Pascal Malassigne, Milwaukee, WI (US); Audrey L. Nelson, Tampa, FL (US); Robert P. Jensen, Milwaukee, WI (US)

(73) Assignee: The United States of America as represented by the Department of Veterans Affairs, Washington, DC (US)

( * ) Notice: Subject to any disclaimer, the term of this patent is extended or adjusted under 35 U.S.C. 154(b) by 0 days.

(21) Appl. No.: 09/917,647

(22) Filed: Jul. 31, 2001

(65) Prior Publication Data

US 2003/0030251 A1 Feb. 13, 2003

Related U.S. Application Data

(63) Continuation-in-part of application No. 09/766,661, filed on Jan. 23, 2001.

(51) Int. Cl.[7] .................................................. B62M 1/14
(52) U.S. Cl. .................................. 280/250.1; 280/304.1
(58) Field of Search ........................... 280/304.1, 250.1, 280/647, 650, 657; 180/907; 297/DIG. 4; 403/52, 65, 66, 112, 113; 16/82, 374, 375

(56) References Cited

U.S. PATENT DOCUMENTS

| | | | | |
|---|---|---|---|---|
| 2,826,242 A | | 3/1958 | Thompson | |
| 3,216,738 A | | 11/1965 | Brockus | |
| 3,261,031 A | | 7/1966 | Gates | |
| 3,666,319 A | | 5/1972 | Moloney, Jr. | |
| 3,854,774 A | | 12/1974 | Limpach | |
| 4,046,418 A | | 9/1977 | Smith et al. | |
| 4,067,249 A | | 1/1978 | Deucher | |
| 4,101,143 A | | 7/1978 | Sieber | |
| 4,140,192 A | * | 2/1979 | Sharpe | 180/907 |
| 4,231,614 A | | 11/1980 | Shaffer | |
| 4,415,177 A | | 11/1983 | Hale et al. | |
| 4,415,202 A | | 11/1983 | Pew | |

(List continued on next page.)

FOREIGN PATENT DOCUMENTS

| | | |
|---|---|---|
| DE | 2725493 | 12/1978 |
| DE | 29 29 138 | 2/1981 |
| GB | 714306 | 8/1954 |
| GB | 2 124 557 | 2/1984 |
| JP | 406197929 | 12/1978 |

*Primary Examiner*—Brian L. Johnson
*Assistant Examiner*—Hau Phan
(74) *Attorney, Agent, or Firm*—Dykema Gossett PLLC

(57) ABSTRACT

The foldable frame of the wheelchair has an opening at the lower rear part thereof for receiving a commode or a tray which supports a removable pail. The seat has front and side cutouts to provide under seat access dual density supporting foam. The seat also has laterally projecting wings at the front thereof to facilitate lateral transfer of a patient. The armrests at each side of the wheelchair pivot upwardly and rearwardly of the chair. Locking members are provided for locking each arm support in its lowered position; and a release lever can be pushed to unlock each arm support. A pair of footrest supports are each contoured so as not to have any sharp edges and are provided with non-slip surfaces and a drain hole. Each footrest support is pivoted to a split block which is slidable vertically along an arm. The block can be tightened and loosened by a lever. A heel and ankle support is pivotally mounted at the front of the chair and is movable from a depending stored position to a generally horizontal position where it is retained for supporting the heel of a user. The pushrims are provided with a non-slip surface and the diameter thereof is increased to provide a better grip. Orthogonal hinges mounted to side frame members allow the frame to fold to a small volume. A carrying bag is provided for ease of transport.

15 Claims, 17 Drawing Sheets

U.S. PATENT DOCUMENTS

| | | | | | |
|---|---|---|---|---|---|
| D271,679 | S | | 12/1983 | Minnebraker | |
| 4,484,780 | A | | 11/1984 | Thompson | |
| 4,500,109 | A | * | 2/1985 | Volin | 280/304.1 |
| 4,768,797 | A | | 9/1988 | Friedrich | |
| 4,805,925 | A | * | 2/1989 | Haury et al. | 280/250.1 |
| 4,805,931 | A | * | 2/1989 | Slasor | 280/650 |
| 4,863,181 | A | * | 9/1989 | Howle | 280/250.1 |
| D305,521 | S | | 1/1990 | Wiatrak et al. | |
| 4,949,408 | A | | 8/1990 | Trkla | |
| 4,981,305 | A | * | 1/1991 | Lockard et al. | 280/250.1 |
| 4,989,890 | A | * | 2/1991 | Lockard et al. | 280/250.1 |
| 5,217,239 | A | * | 6/1993 | Koet | 280/250.1 |
| 5,240,276 | A | * | 8/1993 | Coombs | 280/647 |
| 5,244,222 | A | * | 9/1993 | Benoit | 280/250.1 |
| 5,285,535 | A | * | 2/1994 | Stewart et al. | 297/DIG. 4 |
| 5,297,021 | A | | 3/1994 | Koerlin et al. | |
| 5,409,247 | A | * | 4/1995 | Robertson et al. | 280/250.1 |
| 5,437,497 | A | | 8/1995 | Hutson | |
| 5,517,704 | A | | 5/1996 | Dagostino | |
| 5,544,940 | A | | 8/1996 | Stevens | |
| 5,560,627 | A | * | 10/1996 | Zatulovsky et al. | 280/657 |
| 5,568,933 | A | | 10/1996 | Mizuno | |
| 5,608,925 | A | | 3/1997 | Porter | |
| 5,609,348 | A | | 3/1997 | Galumbeck | |
| D389,099 | S | | 1/1998 | McKay | |
| 5,713,591 | A | | 2/1998 | Zarkhin et al. | |
| 6,241,275 | B1 | * | 6/2001 | Slagerman | 280/650 |
| 6,276,704 | B1 | * | 8/2001 | Suiter | 280/250.1 |
| 6,352,275 | B1 | * | 3/2002 | Lindenkamp | 280/250.1 |

* cited by examiner

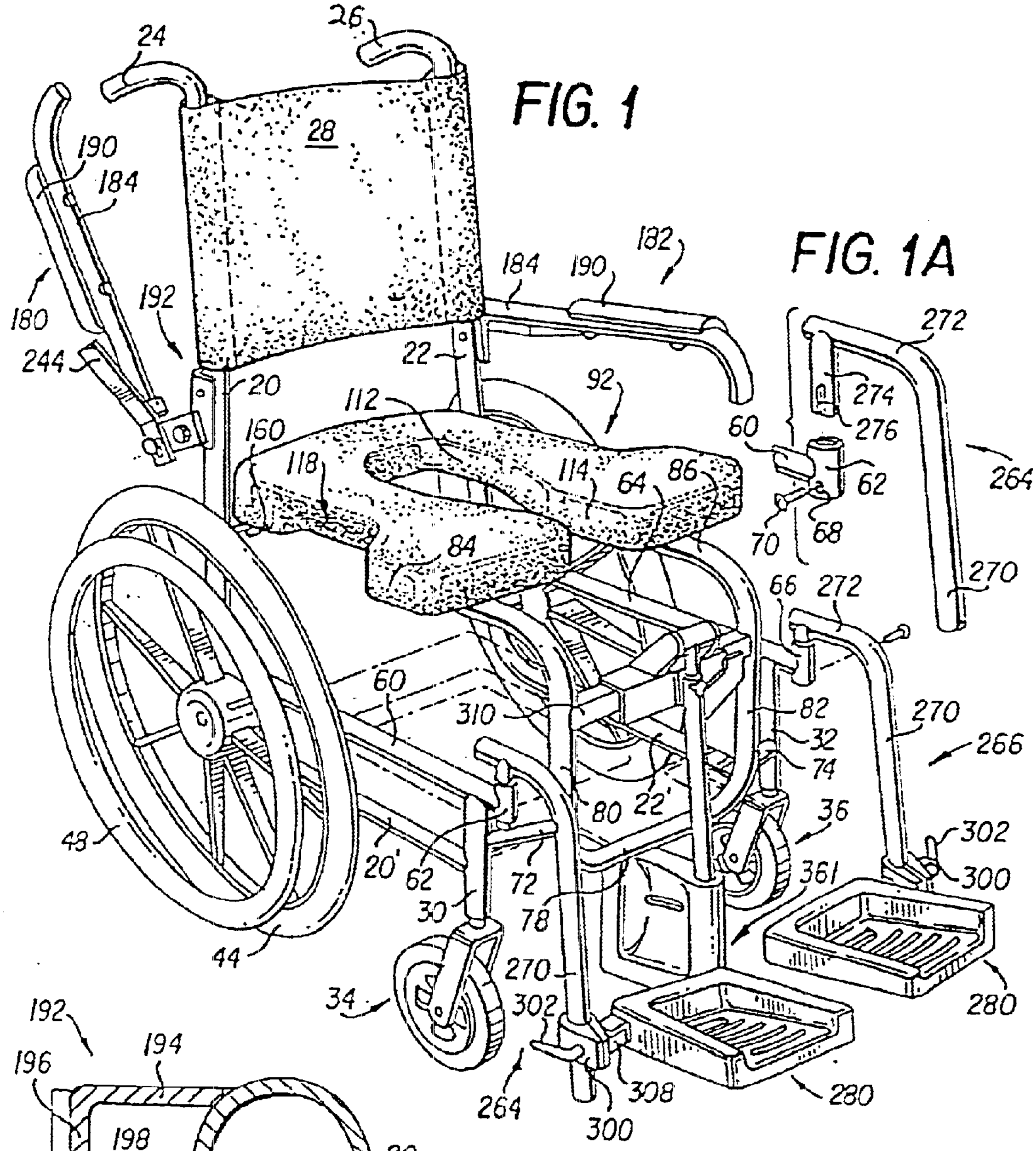
FIG. 1
FIG. 1A
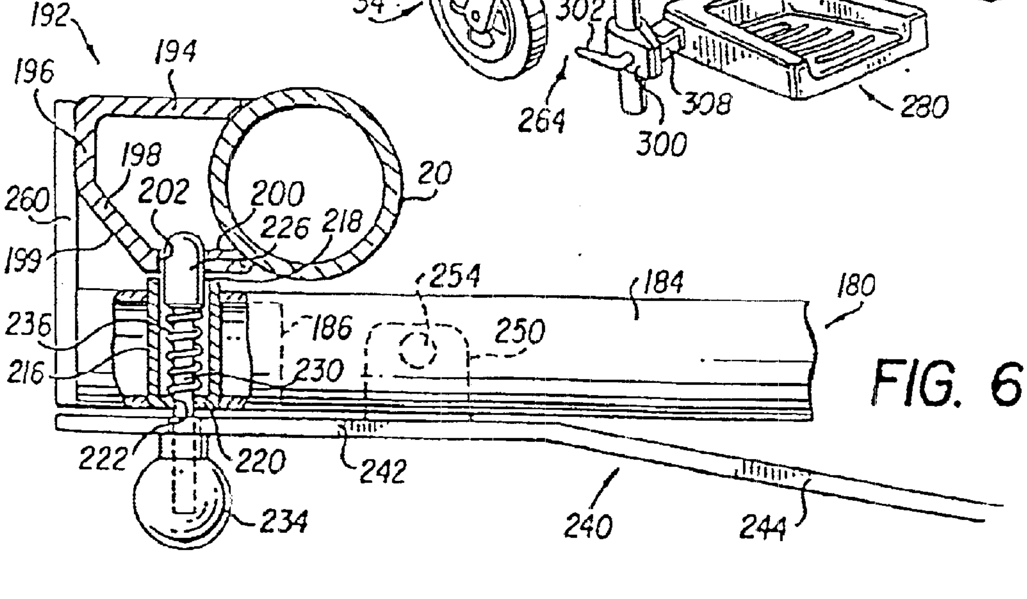
FIG. 6

FIG. 5
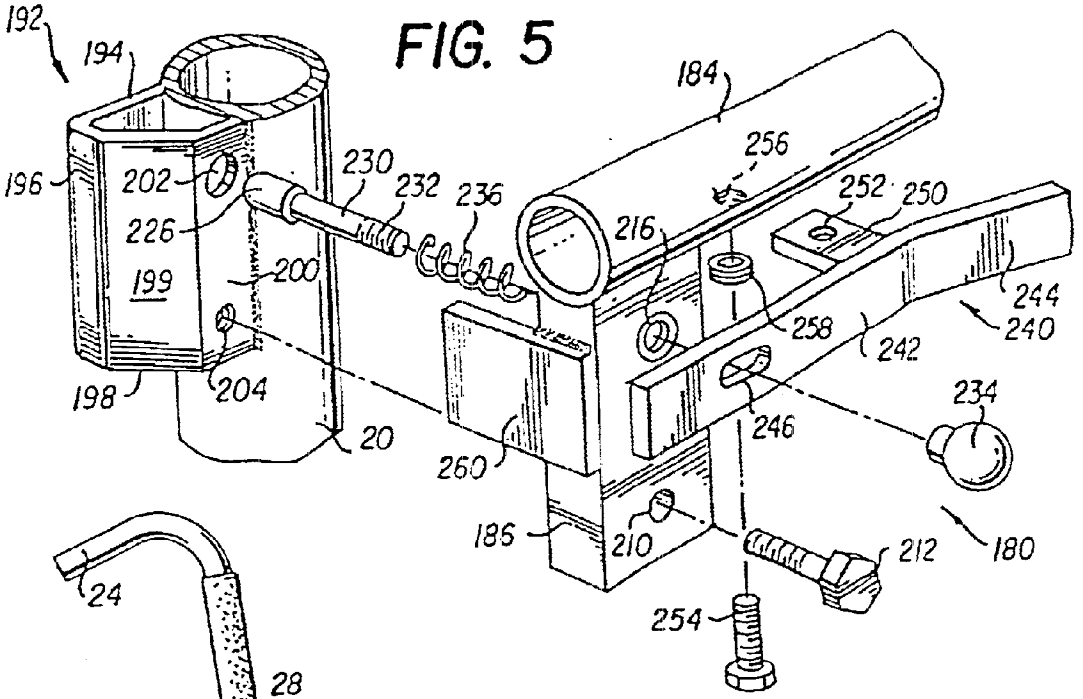
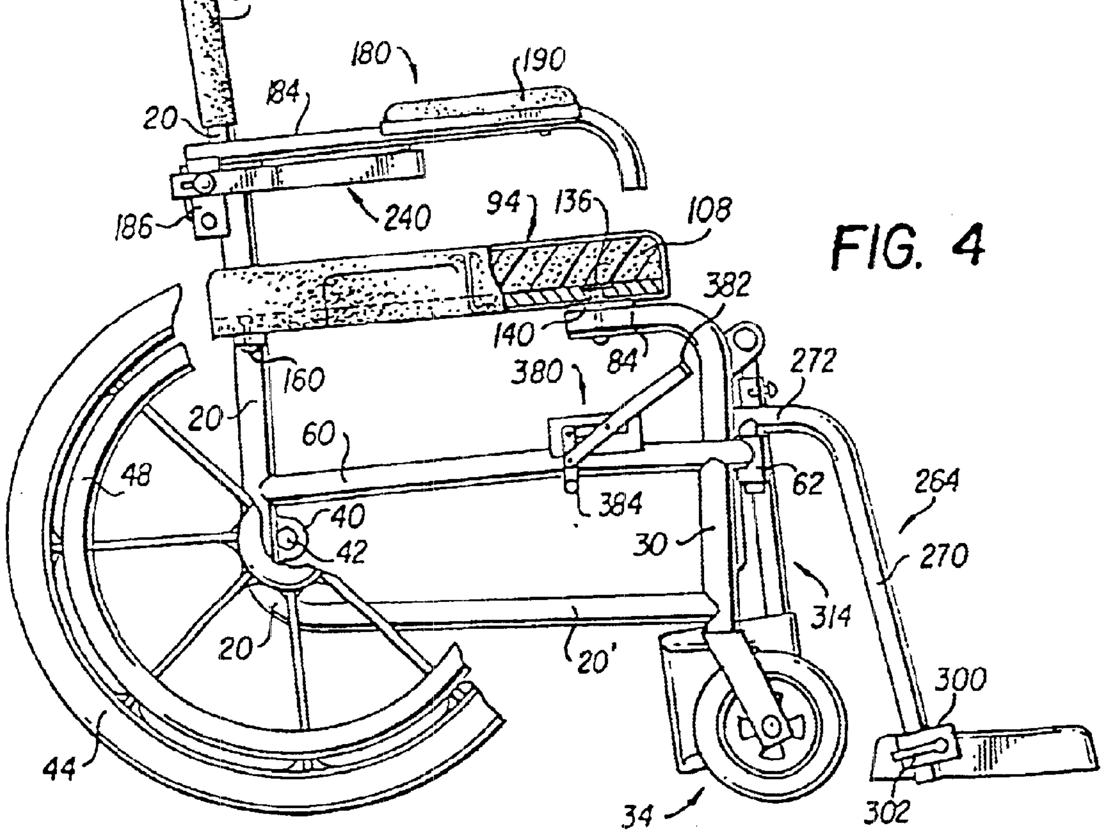
FIG. 4

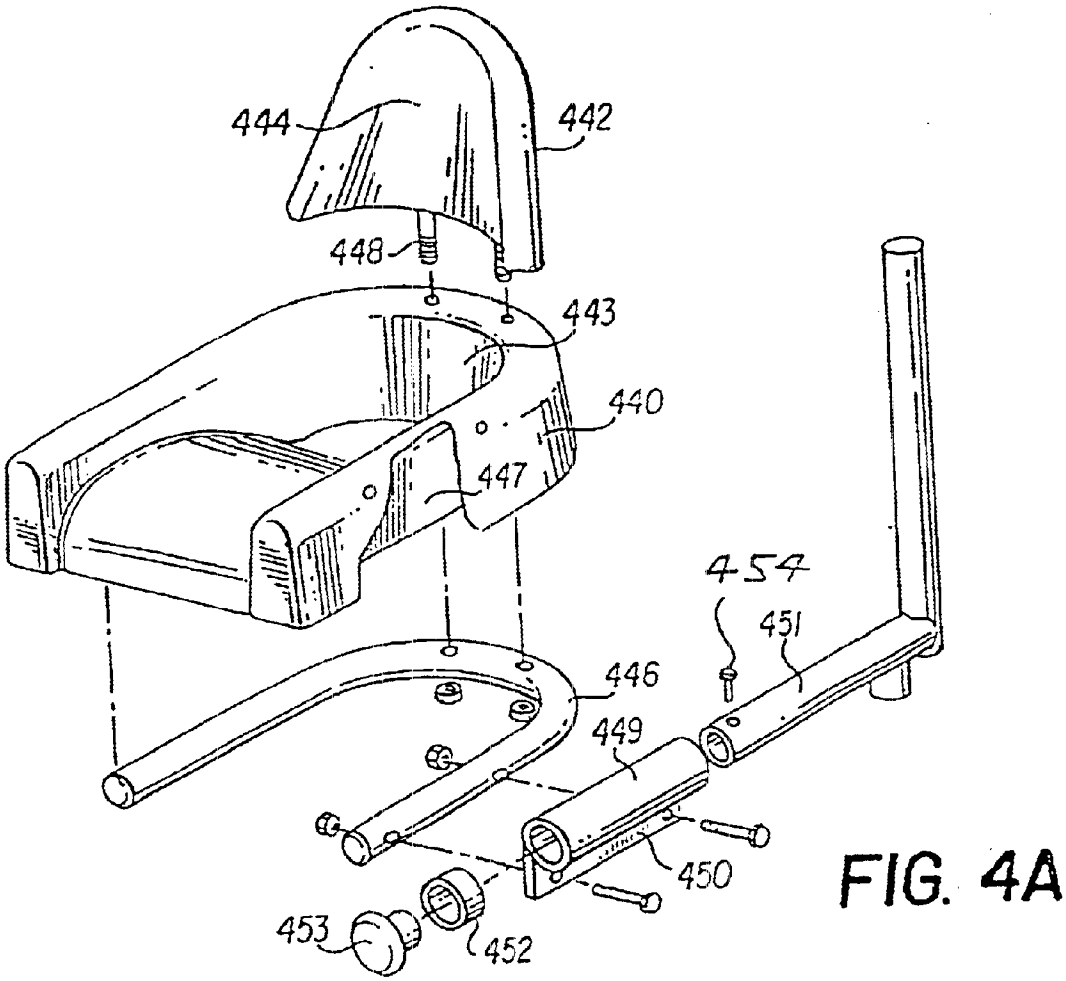
FIG. 4A
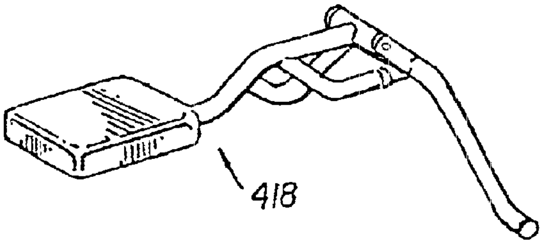
FIG. 12A
FIG. 12B
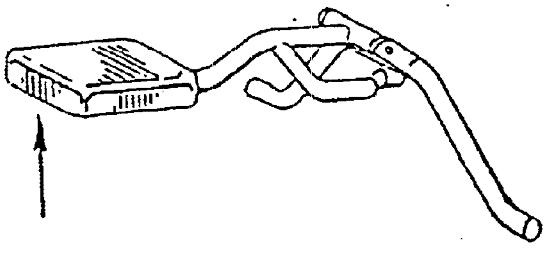

FIG. 6A
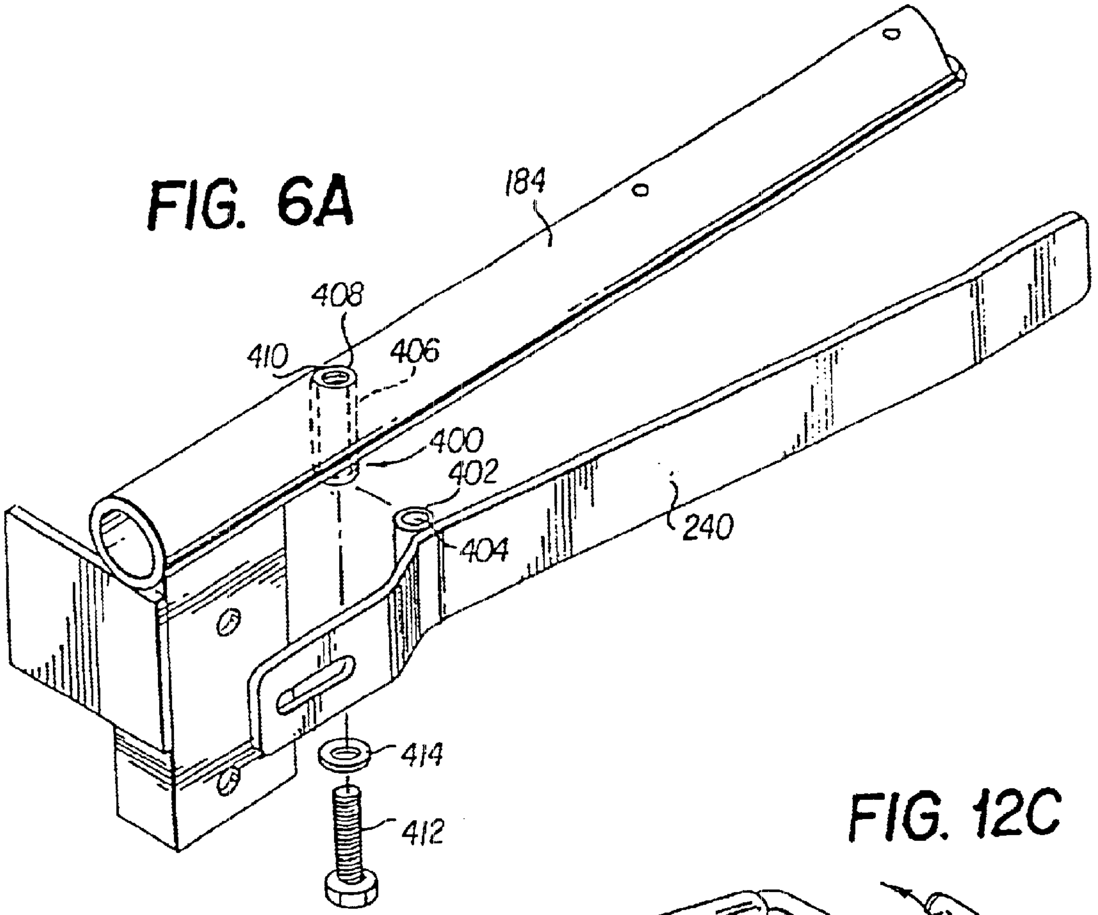
FIG. 12C
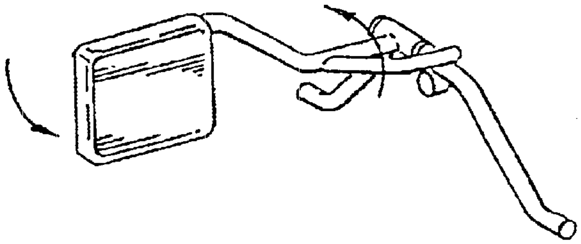
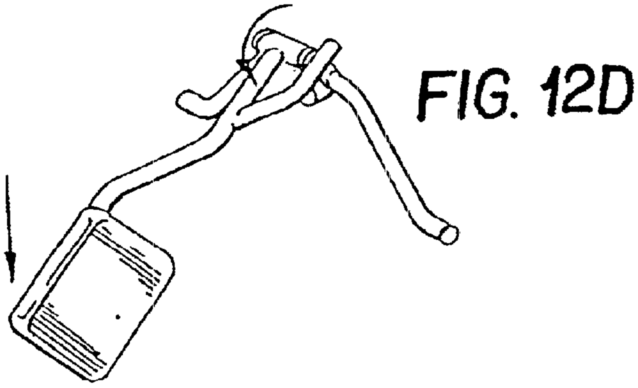
FIG. 12D
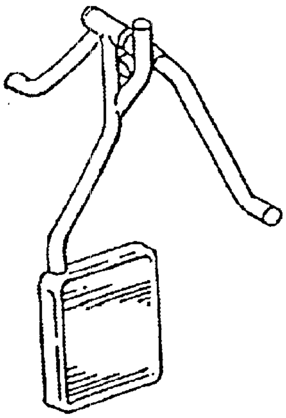
FIG. 12E

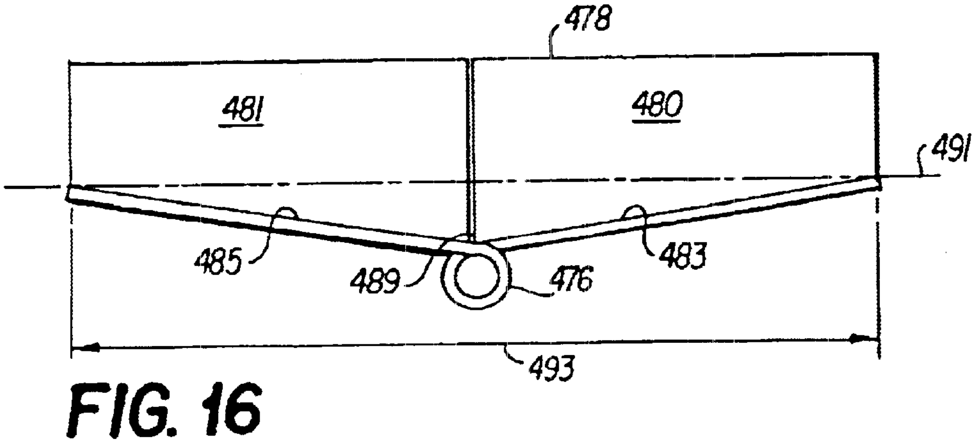
FIG. 16
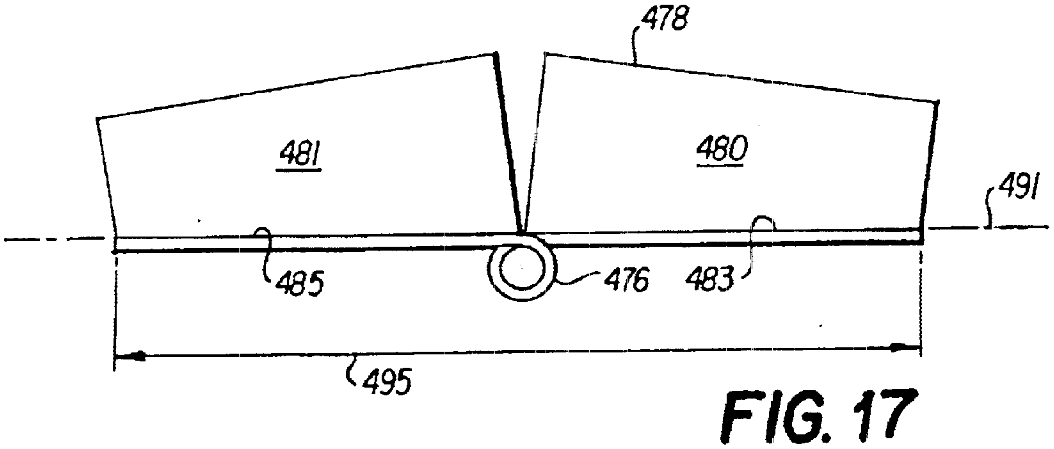
FIG. 17
FIG. 18
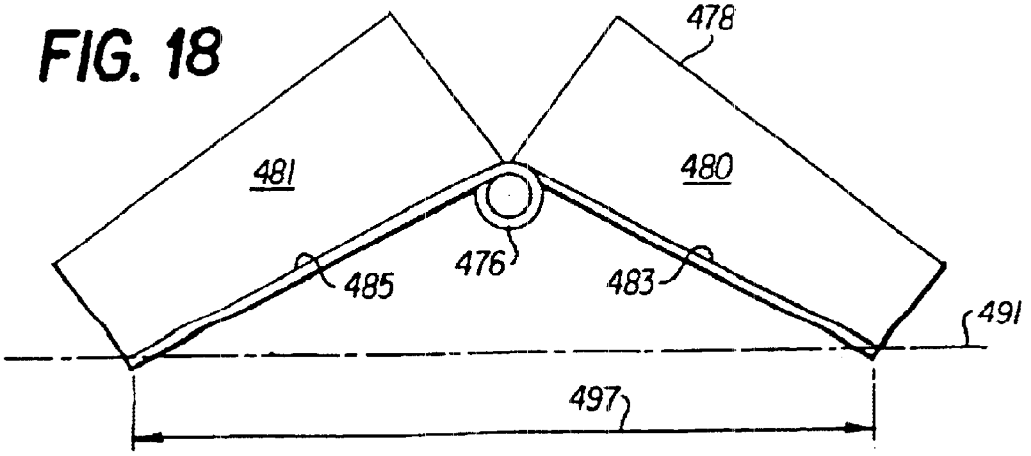

FOLDING COMMODE AND SHOWER WHEELCHAIR

CROSS REFERENCE TO RELATED APPLICATION

This application is a continuation-in-part of U.S. application Ser. No. 09/766,661, filed Jan. 23, 2001, now U.S. Patent Application Publication No. 2002/0024196, the teachings of which are incorporated herein by reference.

BACKGROUND OF THE INVENTION

The present invention is a wheelchair for use by elderly persons or individuals with spinal cord injuries who shower and/or have a bowel movement while in the wheelchair. This type of wheelchair is designed to roll over a toilet or to be rolled into a shower room.

A problem encountered with prior art wheelchairs is that it is difficult for a patient to wash his/her legs and feet, normally requiring the user to bend far forward and reach down to do so. Accordingly, it is an object of the invention to provide means for supporting a user's leg in a raised position so that cleaning of the legs and feet can be accomplished in a much easier manner than when using prior art wheelchairs.

The seats of prior art wheelchairs are unsatisfactory for a number of reasons. The seats do not provide adequate under seat access to enable a user to place a hand in proper position for various toiletting procedures. Such seats are cushioned with foam that often crushes under a patient's weight, and the foam is covered with stitched vinyl materials. This combination results in skin pressure, bruising and pinching which can lead to pressure ulcers, cuts or other injuries to the thigh, buttocks, etc. In addition, prior art seats do not provide adequate top surface area for properly supporting the thighs of a user or for transferring a user onto or off of the seat in a lateral direction.

Prior art wheelchairs have employed many different types of armrests, some of which are disposed in fixed position and others of which are movable or even removable from the chair. Such armrests have certain disadvantages which are overcome with the invention construction. Firstly, it is desirable that the armrests are permanently mounted on the chair rather than being removable therefrom. Fixed armrests often interfere with lateral transfer of a user onto or off of the seat of the chair. Therefore, it is desirable that the armrests be movable into a position where they do not interfere with such movement of a user. When movable armrests are employed, it is further necessary that a mechanism be provided to securely lock the armrest in lowered operative position since users need to hook their arms under the armrest and pull upward against the armrest when positioning themselves in the chair.

Conventional footrests on wheelchairs have presented a number of problems. Footrests are typically flat and may include a heel-strap to hold the user's feet in position. Such heel-straps are held in place by bolts which can cut the feet of the user. Footrests may also utilize height adjustment arrangements which have bolts to hold the footrest in adjusted position. These bolts usually require the use of a tool such as a wrench to loosen and tighten the bolts when adjusting the height of the footrest. Therefore, height adjustment is rather difficult to accomplish, and is very inconvenient for a user.

Prior art footrests do not adequately protect a users toes and have sharp edges, which can damage the skin of a user's foot. The footrests are furthermore slippery when wet. It is also desirable to provide a footrest construction wherein each footrest is adapted to be pivoted out of the way when not in use.

The wheelchair includes drive wheels to which pushrims, or push rings are drivingly connected in the usual manner. Conventional pushrims have relatively small diameters that are difficult for many users to grip in a satisfactory manner. Furthermore, the pushrims are slippery when wet.

SUMMARY OF THE INVENTION

The invention provides a heel support assembly which is adapted to support a leg of a patient in an elevated position so that it is much easier for a user to reach and clean a leg and foot. The assembly is pivotally mounted at the front portion of the frame of the chair and includes a support portion for supporting the heel of the patient. The assembly is normally stored in a depending stored position at the front of the chair. When it is desired to wash the legs and feet, the assembly is manually grasped and pivoted upwardly into a generally horizontal position whereupon a portion of the assembly is rotated in one direction so that the support portion is horizontally disposed for receiving a heel of one leg. The assembly is slightly lowered into a position so that the assembly is retained in the desired position. When the washing procedure is finished, the assembly may be slightly lifted, whereupon it can be rotated in the opposite direction and pivoted downwardly into its stored position where it does not interfere with any other components of the chair. In another featured embodiment, contoured footrests with heel supports are employed.

The seat of the invention wheelchair has a central opening and a cutout formed in the front portion of the seat, the cutout being in communication with the central hole to provide under seat hand access from the front of the seat. In addition, each of the side portions of the seat have cutouts formed therein to provide under seat hand access from both sides of the seat. The invention seat employs open cell foam which is covered with seamless vinyl stretched over the foam to provide good comfort and to prevent skin "pinching". The seat is elongated from front to back to provide proper support for the thighs of a use. Additionally, the seat is provided with laterally extending wings adjacent the front portion of the seat to provide additional upper surface area which facilitates lateral transfer of a patient onto or off of the seat. An alternative embodiment employs a seat cushion formed of a polyurethane foam having two densities, in which the outer region is formed of a foam having first density and the inner region is formed of a relatively softer foam material.

The armrests of the invention are permanently mounted on the frame of the chair for pivotal movement with respect to the frame. The armrests can swing from a lowered operative position to a raised position. The armrests swing through an angle of greater than 90 degrees so that in the raised position, they extend rearwardly of the chair thereby providing an unobstructed space for access or transfer of a user to the seat in a direction laterally of the chair. A stop member is provided on each armrest for engaging the frame and limiting such rearward pivotal movement of the armrests. A locking means is provided which provides a positive lock preventing each armrest from releasing and swinging in an upward direction, whereby users can hook their arms under the armrests and apply considerable force in an upward direction without fear of accidental release of the armrests from locked position. In addition, a release lever is provided for releasing the locking means when desired. The lever is positioned close to the armrest so that it is readily accessible, and furthermore, it can be easily operated simply by pushing on the outer end of the lever.

The footrests of the invention are mounted on adjustment mechanisms which are slidably adjustable along footrest arms supported by the frame. These arms are normally retained in a particular position when in use, but may be rotated with respect to the frame when not in use. Each footrest includes a support portion which is pivoted to the associated adjustment mechanism. The position of the adjustment mechanism is controlled by a manually operable handle which can be effectively operated by a user without undue effort. The footrests are contoured to receive the foot of a user and extend beyond the toes of the user to provide protection for the toes. The footrests are contoured to receive the foot of a user and have rounded edges to prevent a user's feet from being cut. The footrests also have raised portions to provide a non-slip surface and have a drain holes formed therethrough so that water can drain from the footrests.

The pushrims of the invention are unique in that they are oversized to provide larger diameters within a particular range which permits users to more effectively grip the pushrims. Additionally, the space between each of the pushrims and the adjacent drive wheel are within a particular range to provide satisfactory results. The pushrims are also rubber coated to prevent slipperiness in wet environments.

The frame of the wheelchair may, in another featured embodiment, have a foldable frame and a pivotable seat to allow the wheelchair to be stored in a small volume when not in use. A bag with casters is provided for carrying the folded wheelchair for easy transport.

BRIEF DESCRIPTION OF THE DRAWINGS

FIG. 1 is a top perspective view of the invention wheelchair;

FIG. 1A is an exploded view of a small portion of the structure shown in FIG. 1;

FIG. 4 is a side view of the wheelchair;

FIG. 4A is a top right front perspective view of an alternative embodiment of the footrest;

FIG. 5 is a top perspective exploded view of the locking mechanism of an armrest of the wheelchair;

FIG. 6 is a top assembled view, partly broken away and in section of the locking mechanism components shown in FIG. 5;

FIG. 6A is an exploded view of an alternative embodiment of the paddle release;

FIGS. 12A–E are successive top right front perspective views of the heel support of FIG. 11 in various positions;

FIGS. 16–18 are successive front schematic views of a mounting block for a seat of a wheelchair;

DESCRIPTION OF THE PREFERRED EMBODIMENTS

Figure 3:
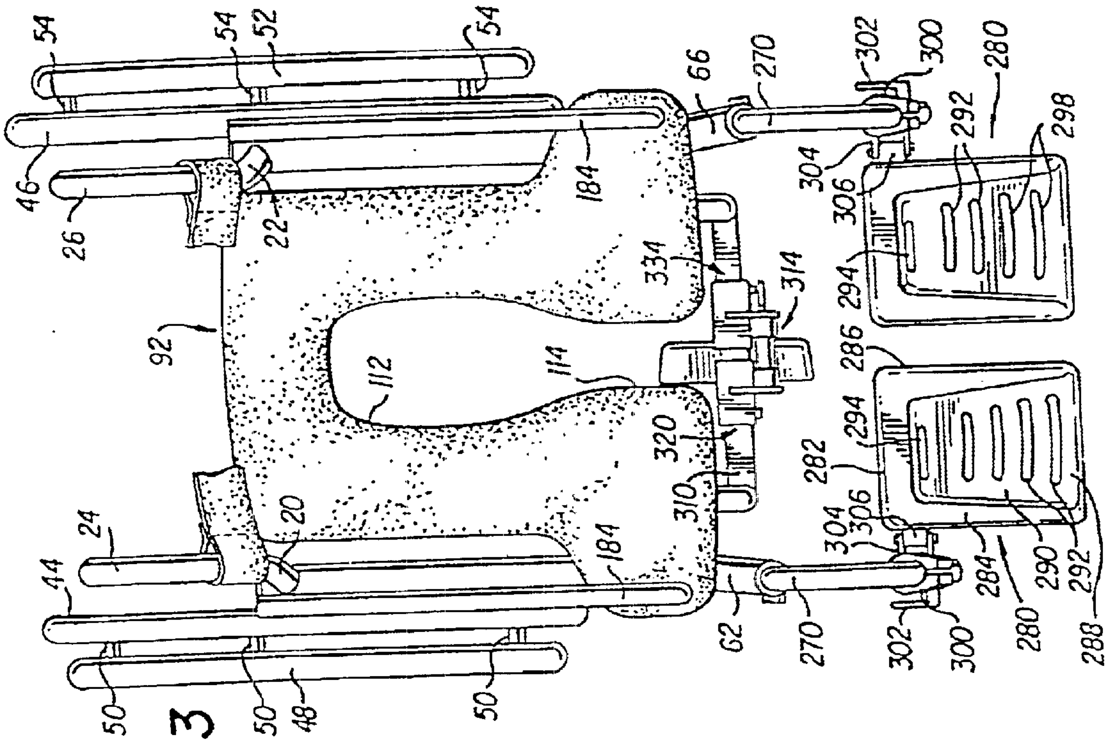
FIG. 3 is a top view of the wheelchair.

Referring now to the drawings wherein like reference characters designate corresponding parts throughout the several views, there is shown in FIGS. 1–4 inclusive the wheelchair which includes a frame made of tubular members formed of metal such as aluminum most of which have a circular cross-section so that they can be easily grasped by a user and which have large rounded edges to prevent cutting the bare skin of the user while showering. The frame includes at the rear portion thereof a pair of spaced frame members 20 and 22 which have free ends 24 and 26 respectively which angle downwardly away from the chair to facilitate pushing of the chair by a person other than the user. A back support 28 comprises a flexible sheet of material formed of an open mesh fabric that allows water to flow therethrough during showering. The opposite side edges of the back support are turned over and stitched to the body of the back support to form two tubular sleeve portions at opposite sides of the back support. These sleeve portions are slidably mounted on frame members 20 and 22.

Frame member 20 extends downwardly and joins with a generally horizontal portion 20' the outer end of which is rigidly secured as by welding to a vertical frame member 30. Frame member 22 is similar to frame member 20 and extends downwardly and joins with a generally horizontal portion 22' the outer end of which is rigidly secured as by welding to a vertical frame member 32. The lower ends of members 30 and 32 are open and receive upwardly directed members of conventional caster wheel assemblies 34 and 36 respectively which operate in a well-known manner. As seen in FIG. 4, an axle support member 40 is rigidly secured as by welding to frame member 20 and fixedly supports an axle 42 upon which a drive wheel 44 is rotatably mounted. A further drive wheel 46 is rotatably mounted on an axle (not shown) supported by frame member 22 in a manner similar to that in which axle 42 is supported on frame member 20.

A pushrim 48 is drivingly connected to drive wheel 42 by connecting members 50, while a pushrim 52 is drivingly connected to drive wheel 46 by connecting members 54. The pushrims have circular cross-sections, and the outer diameter of each pushrim is in the range of about 27 mm to about 42 mm, and preferably about 35 mm. The space between each pushrim and the adjacent drive wheel is in the range of about 20 mm to about 30 mm, and preferably about 25 mm. The foregoing dimensions have been found to provide optimum gripping characteristics for a user's hands. In order to prevent slipping of the hands in a wet environment, the pushrims are coated with rubber.

A generally horizontal frame member 60 is connected as by welding between frame member 20 and frame member 30, frame member 60 extending forwardly of frame member 30 and having a footrest support 62 connected as by welding to the end thereof. A frame member 64 similar to member 60 is connected as by welding between frame member 22 and frame member 32, frame member 64 extending forwardly and having a footrest support 66 connected to the end thereof. Footrest supports 62 and 66 are identical to one another and comprise tubular members open at the top and bottom thereof. As seen in FIG. 1A, support 62 has holes 68 formed in diametrically opposite sides thereof which are adapted to received pin means 70 which may be in the form of a threaded bolt which is threaded into a threaded hole 68. The purpose of pin 70 will be explained hereinafter.

Referring to FIG. 4, the wheelchair is provided with a conventional brake mechanism 380 mounted on frame member 60 and including a handle 382 for moving the braking element 384 into engagement with drive wheel 44. This brake mechanism is not shown in the remaining figures for the sake of clarity.

FIG. 4A illustrates an embodiment of a footrest which features a contoured rest component 440 and a lift component 442. Rest 440 has an overall rectangular appearance with rounded edges for holding the user's foot safely in place. Rest 440 also incorporates a non-slip surface and a hole for water drainage. A rear portion of rest 440 incorporates a rounded portion 443 to accommodate the shape of the heel.

Lift 442 is formed of a semi-soft elongated and curved cup 444 to hold securely the user's foot and heel when elevated for washing. Lift 442 is rounded and shaped for comfort.

Rest 440 has a curved support tube 446 located in a recess 447. Lift 442 is secured to rest 440 by bolts or pins 448, which are secured in openings in the support tube 446. Support tube 446 is connected to a footrest mount 449 which has tabs 450 for receiving bolts. Footrest mount 449 is sleeved over the tubular end of the lower leg rest support 451. Retaining sleeve 452, having a locking screw 454, secures footrest mount 449 to tab 450. A plug 453 covers the opening in the support 449.

Figure 2:
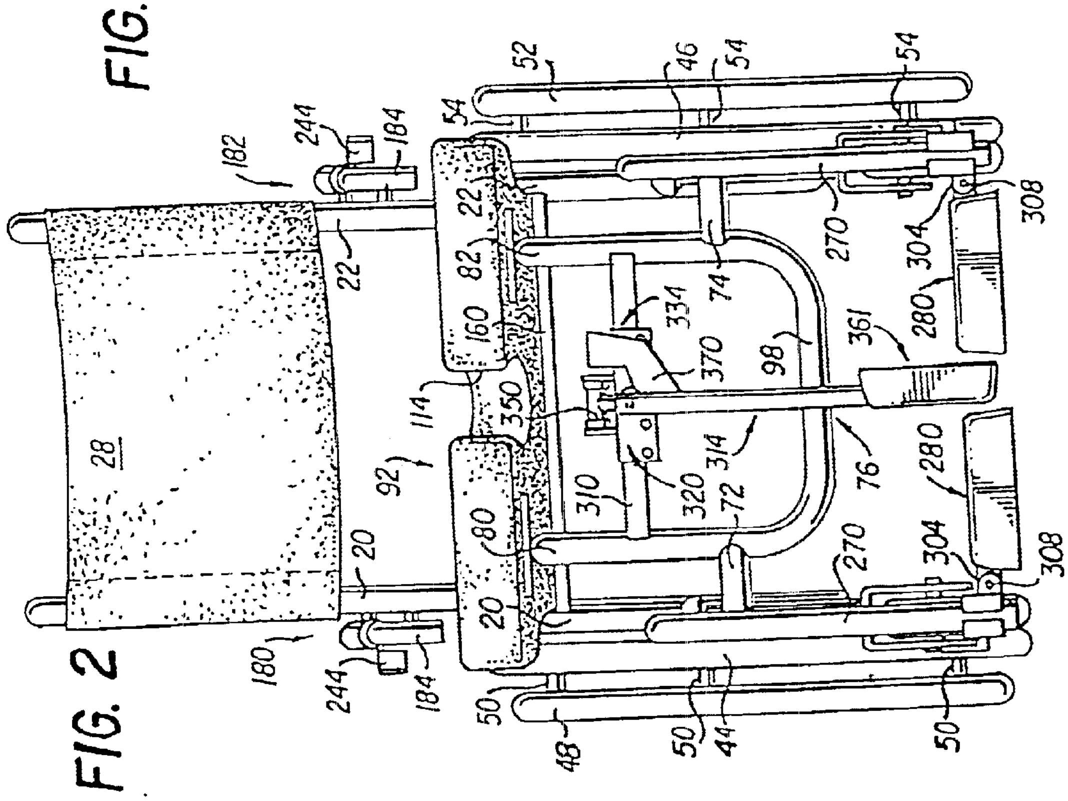
FIG. 2 is a front view of the wheelchair.
Figures 7, 13:
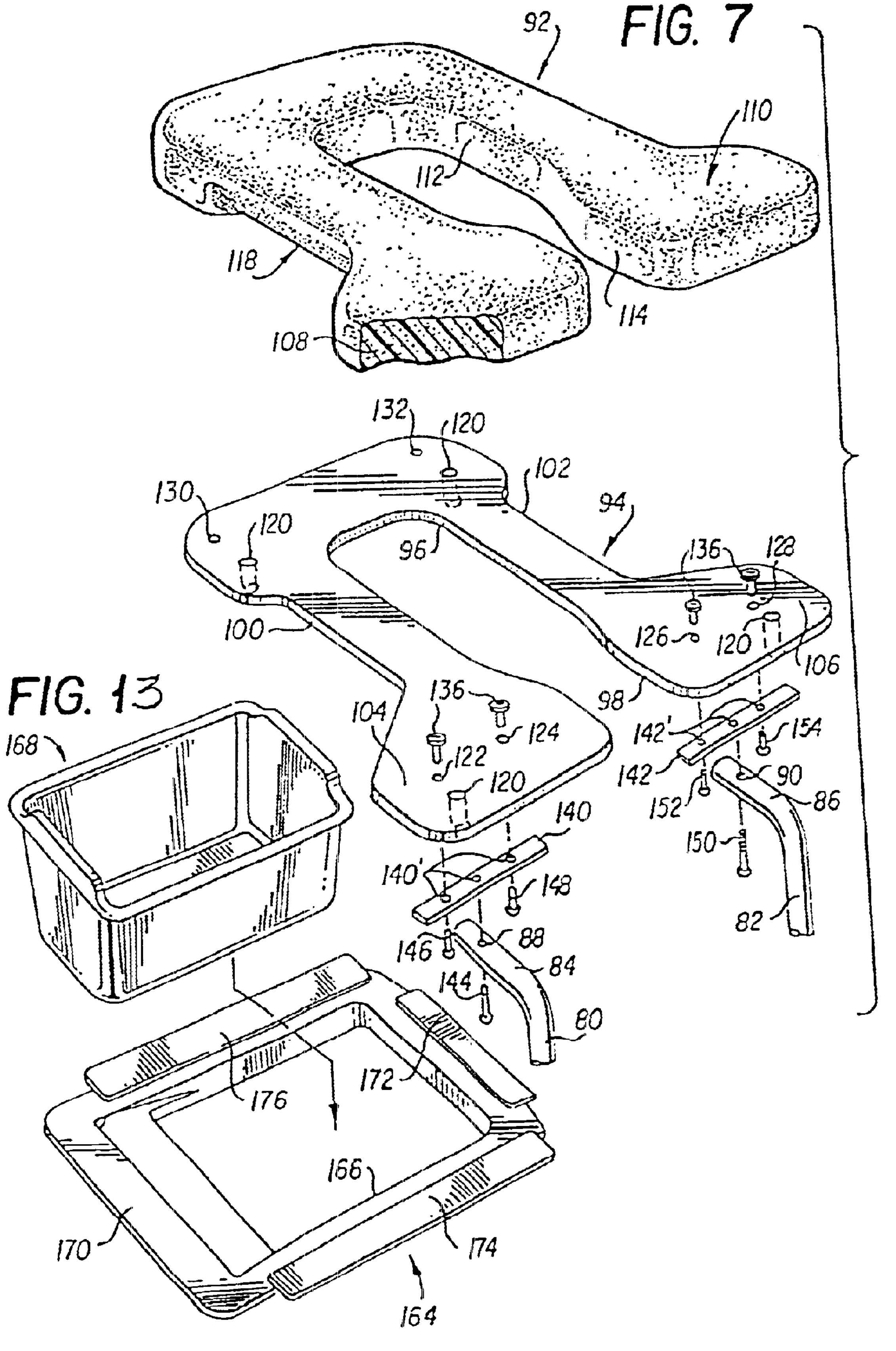
FIG. 7 is an exploded view, partly broken away of the seat and part of its mounting structure on the wheelchair.
FIG. 13 is an exploded view showing a tray and removable pan which are adapted to be mounted on the frame of the wheelchair.

The frame also includes a pair of forwardly and inwardly directed members 72 and 74 having one end thereof connected as by welding to frame members 30 and 32 respectively. As seen in FIG. 2, the opposite ends of members 72 and 74 are connected as by welding to unitary frame member 76 including a generally horizontal lower portion 78 which joins with generally vertical portions 80 and 82 to which members 72 and 74 are connected. Portions 80 and 82 join with generally horizontal free end portions 84 and 86. As seen in FIG. 7, holes 88 and 90 are formed through end portions 84 and 86.

The seat 92 includes a base 94 formed of a rigid material such as plywood which is coated and sealed. The base has a central hole 96 formed therethrough and a cutout 98 is formed in the front portion thereof and being in communication with central hole 96. A pair of cutouts 100 and 102 are formed in the opposite sides of the base. The base also includes laterally extending wings 104 and 106 on opposite sides of the front portion thereof. The seat includes a body 108 of open cell urethane foam of a density appropriate for providing proper cushioning for a user. Body 108 is covered with a sheet 110 of seamless thermoformed vinyl which has a shape matching that of the foam. In the finished seat, the vinyl is stretched over the foam and stapled to base 94.

The shape of foam 108 and sheet 110 is similar to that of the base and includes a central hole 112 with a cutout 114 formed in the front portion thereof and being in communication with hole 112. Cutout 114 provides under seat hand access from the front of the seat. Each of the side portions of the seat has a downwardly and inwardly tapering cutout 118 formed therein to provide under seat hand access from both sides of the seat, only one of cutouts 118 being visible in FIG. 7.

Four spaced holes 120 are formed through base 94 which allow air to enter below the foam, and further which may serve as drain holes should any water collect between the foam and the base. Countersunk holes 122 and 124 are formed through wing portion 104 of the base; and similar holes 126 and 128 are formed through wing portion 106 of the base. A further pair of similar holes 130 and 132 are formed through the rear portion of the base. Conventional "T" nuts such as indicated by reference numbers 136 are embedded in the holes 122–132 in the finished base for the purpose of securing the seat to the wheelchair.

A pair of metal strips 140 and 142 are each provided with three spaced holes 140' and 142' respectively formed therethrough. The center hole 140' is aligned with hole 88 and receives a fastener 144 through the aligned holes. Fastener 144 may comprise a wood screw which passes through hole 88 and center hole 140' and is threaded into the plywood base 94. The other two holes 140' are aligned with holes 122 and 124. Threaded bolts 146 and 148 pass through holes 140' and are threaded into nuts 136 disposed within holes 122 and 124 respectively. A fastener 150 similar to fastener 144 extends through hole 90 and center hole 142' and is threaded into the base. The other two holes 142' are aligned with holes 126 and 128. Threaded bolts 152 and 154 pass through holes 142' and are threaded into nuts 136 disposed within holes 126 and 128 respectively. When the seat is in assembled position on the wheelchair, the front portion of the seat is supported by the rearwardly extending portions 84 and 86 of the frame.

Figure 7A:
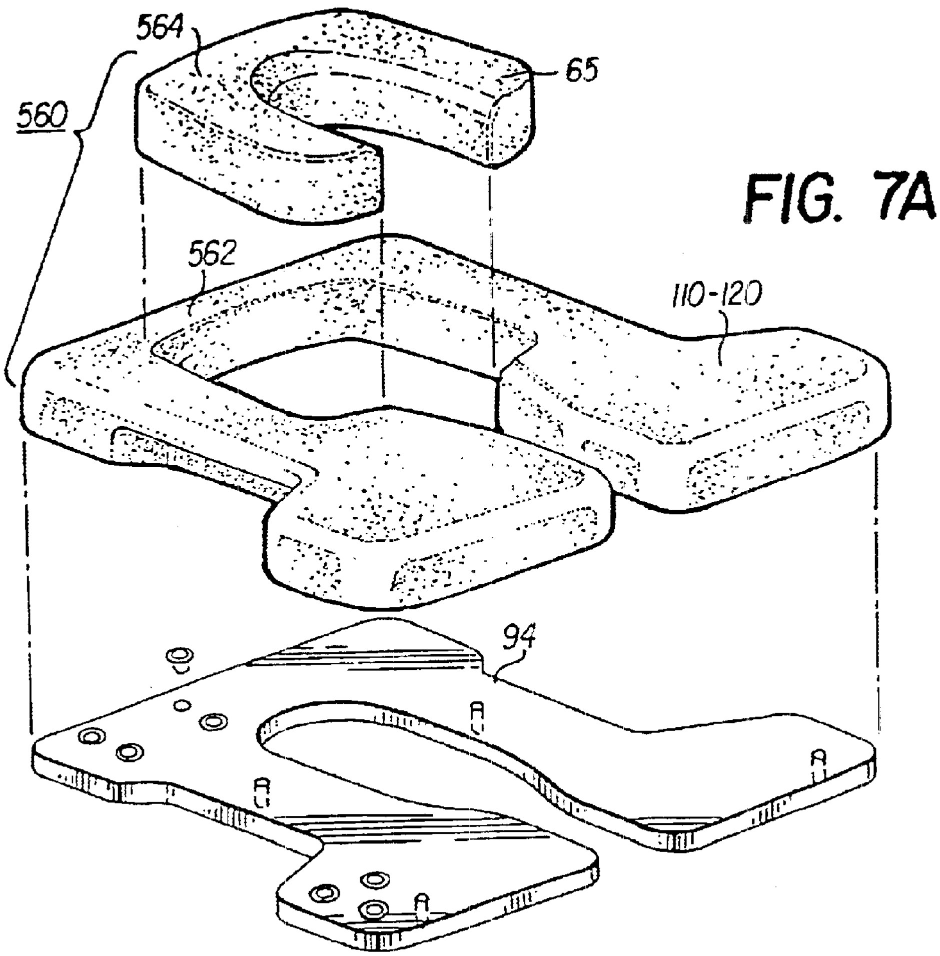
FIG. 7A is a top left front perspective view of an alterative embodiment of the seat cushion core having dual foams.

The seat cushion shown in FIG. 7 is formed of a single polyurethane foam density of 110–120 IFD (Indentation Force Deflection) material. In the configuration illustrated in FIG. 7A, where similar elements have the same reference numerals as in FIG. 7, the seat cushion 560 is composed of two different densities of polyurethane foam. Most of the seat including the outer portion 562 is made of the harder 110–120 IFD foam. The central portion 564 support the ischial tuberosities of the patient is made of a softer 65 IFD foam as illustrated.

As seen most clearly in FIG. 2, a cross member 160 is secured at its opposite ends as by welding to frame members 20 and 22. Cross member 160 is tubular and of generally square cross-section. Cross member 160 is provided with a pair of holes (not shown) therethrough which are adapted to be aligned with holes 130 and 132 formed through base 94 of the seat and within which are disposed "T" nuts. Threaded bolts similar to bolts 146 extend through the holes formed in the cross member and are threaded into the "IT" nuts disposed within holes 130 and 132.

Accordingly, the seat is suspended between cross member 160 and frame portions 84 and 86. The rear portion of the frame defines an opening between frame members 20 and 22 and below cross member 160 which is adapted to receive a commode which can extend between frame members 20' and 22' as well as between frame members 60 and 64 up to a point adjacent portions 78, 80 and 82 of the frame so that the commode can be properly positioned beneath the seat of the chair.

Referring to FIG. 13, a tray and pan are illustrated which are adapted to be inserted through the opening at the rear portion of the frame when a bowel movement of a user does not occur over a commode. In such a situation, the tray and pan are supported on the frame in position beneath the seat. The tray 164 has a central recess 166 with a flat bottom which is adapted to receive and support the lower part of a conventional pan 168. The tray has a ramp portion 170 for sliding the pan onto or off of the tray. The tray has an integral portion 172 extending from the front part thereof which is adapted to rest on portion 78 of the frame. A pair of integral portions 172 and 174 extend from opposite sides of the tray and are adapted to rest on frame members 20' and 22' respectively when the tray is in operative position. It is apparent that the tray can be quickly and easily inserted into and removed from operative position relative to the frame. Furthermore, when the tray is in operative position, the pan can readily be readily placed in position on or removed from the pan when desired.

Referring to FIG. 1, a pair of armrests 180 and 182 are pivotally supported by frame members 20 and 22 respectively so that the armrests are disposed at opposite sides of the frame. Armrest 180 is shown in its raised position wherein it has been pivoted upwardly and rearwardly of the chair to its limit of movement in such direction.

Armrest 182 is shown in its lowered locked position which represents its limit of movement in the opposite direction. The details of construction of each of the armrests are the same, so a description of armrest 180 will suffice for both of the armrests.

Referring to FIGS. 1, 4, 5 and 6, armrest 180 comprises an arm support portion including a tubular member 184 of circular cross-section and a plate 186 which is secured as by welding to member 184 and extends at substantially a right angle thereto. The arm support portion also includes the usual pad 190 which is bolted to member 184 in a conventional manner. As seen in FIG. 5, a fitting 192 is secured as by welding to frame member 20 and includes a first wall portion 194 welded to frame member 20 and which joins with a second wall portion 196 extending generally at a right angle to wall portion 194. Wall portion 196 joins with a wall portion 198 which is disposed at an angle of about 45 degrees to wall portion 196 and defines an outer surface 199 thereon which acts as a cam surface when armrest 180 is lowered into locked position. Wall portion 198 joins with a wall portion 200 which is welded to frame member 20. Wall portion 200 has a first through hole 202 formed therethrough to define a locking member; and a second threaded hole 204 is also formed through wall portion 200.

Plate 186 has a hole 210 formed therethrough which is aligned with hole 204. A threaded bolt 212 extends through hole 210 and is threaded into hole 204 so that the arm support portion is pivotally mounted on fitting 192 connected to frame member 20. As seen in FIG. 6, a tubular sleeve 216 is press fitted within a suitable hole formed through member 184, the sleeve having an open end 218 and a closed end 220 having a hole 222 formed through the center thereof. A locking member 226 is adapted to fit within hole 202 to lock the armrest in the position shown in FIG. 6. The locking member includes an elongated reduced portion 230 which passes through hole 222 and has a threaded end 232. A knob 234 is threaded onto the end 232. A compression spring 236 is disposed around reduced portion 230, one end of the spring engaging end wall 220 of the sleeve and the other end of the spring engaging a shoulder on locking member 226 to normally bias locking member 226 into locked position and securely maintaining the locking members in engagement with one another until manually released.

Referring to FIG. 5, a release lever or paddle 240 includes an inner end 242 and an outer end 244. The inner end 242 of the lever has an elongated slot 246 formed therethrough which slidably receives the reduced portion 230 of locking member 226. A plate 250 is secured as by welding to the inner end of the release lever and extends at a generally right angle thereto. A hole 252 is formed through plate 250 and receives a threaded bolt 254 which is threaded into a threaded hole 256 formed in the bottom of tubular member 184, a spacer 258 being disposed between plate 250 and tubular member 184.

It is apparent that when the locking means is in the position shown in FIG.6, armrest 180 will be securely retained in this position. When it is desired to pivot armrest 180 upwardly and rearwardly of the chair, the outer end of the release lever is simply pushed inwardly toward the chair. This can be done with the fingers while tubular member 184 is grasped in the hand of a user. As the outer end of the release lever is pushed inwardly, the release lever will pivot about the axis of bolt 254, and the inner end of the lever will swing outwardly which causes knob 234 to be moved away from the chair to withdraw locking member 226 from hole 202. When the locking members are disengaged, the armrest can pivot upwardly and the user can release the lever. When the armrest is pivoted downwardly toward its locking position, the outer rounded end of locking member 226 engages cam surface 199 on fitting 192 and causes the locking member to be urged inwardly to the plane of the outer surface of wall portion 200 of fitting 192 so that locking member 226 can again enter hole 202 and lock the armrest in position.

When armrest 180 is pivoted into the position shown in FIG. 1, its rearward movement is limited by a stop member which as seen in FIG. 5 takes the form of a plate 260 which is secured as by welding to plate 186 and extends laterally of plate 186 at a generally right angle thereto. As armrest 180 pivots rearwardly, the laterally extending portion of plate 186 engages frame member 20 to limit such pivotal movement of the armrest.

FIG. 6A illustrates an alternative embodiment of the invention which the release paddle 240 is secured to the tubular member 184, forming the support for the padded arm rest (not shown), by means of hinge 400 formed of a lower sleeve 402 having a through opening 404. The sleeve 402 is secured for example as by welding to the paddle 240. The sleeve 402 is aligned with an upper sleeve 406 secured likewise as by welding in an opening 408 in tubular member 184 as shown. The upper sleeve 406 likewise has a through opening 410 aligned with the opening 404 in the lower sleeve 402. A threaded bolt or pin 412 which passes through the opening 404 is threadably secured in the opening 410 in the upper sleeve 406. A washer 414 provides a bearing surface between the head of the bolt and the lower end of the lower sleeve 402 as shown. The arrangement provides a secured and stable pivot or hinge for the release paddle 240.

The footrest means of the wheelchair comprises a pair of footrests 264 and 266 disposed at opposite sides of the front portion of the frame. The details of construction of the two footrests are the same, and accordingly, a description of footrest 264 will suffice for both footrests. As seen in FIG. 1A, footrest 264 includes a footrest arm 270 having an upper end 272. The arm includes a depending tubular portion 274 which is secured as by welding to upper end 272. Portion 274 has slot means in the form of opposite elongated slots 276 formed in the lower end thereof. Portion 274 is disposed within footrest support 62, and pin 70 is received within slots 276 which normally prevents rotation of the footrest with respect to the frame. However, when it is desired to place a footrest in a different position, the footrest arm can be lifted up so that pin 70 comes out of the slots 276, whereupon the footrest can be swung to another position while depending portion 274 is still within support 62. It is also apparent that the footrest arm can be lifted up so that depending portion 274 is removed entirely from support 62 whereby the footrest can be separated from the wheelchair when so desired.

As seen in FIG. 3, a pair of similar foot support portions 280 are supported on the lower end portions of footrest arms 270. Each foot support portion is formed of a suitable plastic material and is contoured to receive the foot of a user. Portions 280 each include a back wall 282, a pair of side walls 284 and 286 and an open front portion 288 along with a surface 290 for directly supporting the bottom of the feet. The foot support portion is elongated so as to extend beyond the toes of a user and is contoured so as to have rounded edges. Each foot surface 290 is provided with raised portions 292 to provide a non-slip surface. A drain hole 294 is provided through each foot support portion 280 so that water can drain therefrom.

A conventional split block 300 is slidably mounted on each of the footrest arms 270 and is provided with a threaded member (not shown) which is threaded into oppositely threaded holes in spaced portions of the split block so that rotation of the threaded member in opposite directions serves to tighten or loosen the split block on the associated arm. The threaded member is connected to an operating handle 302 which can be readily swung back and forth by a user to either loosen the block for movement with respect to the associated arm or to tighten and lock the block in position on the arm, thereby providing an adjustment mechanism for adjusting the position of the split block on the associated footrest arm. Preferably, split block 300, or at least a portion thereof that slidably mates with footrest arm 270, is constructed from a self-lubricating nylon to ensure adjustability when desired.

A pair of spaced ears 304 are fixed to block 300 and extend laterally therefrom. A projection 306 fixed to footrest support portion 280 fits between ears 304, and a pivot pin 308 extends through suitable holes formed in ears 304 and projection 306 whereby portion 280 is pivotally supported by the associated block so that portion 280 can be swung about the axis of pivot pin 308 into a generally vertical position when so desired.

Figure 8:
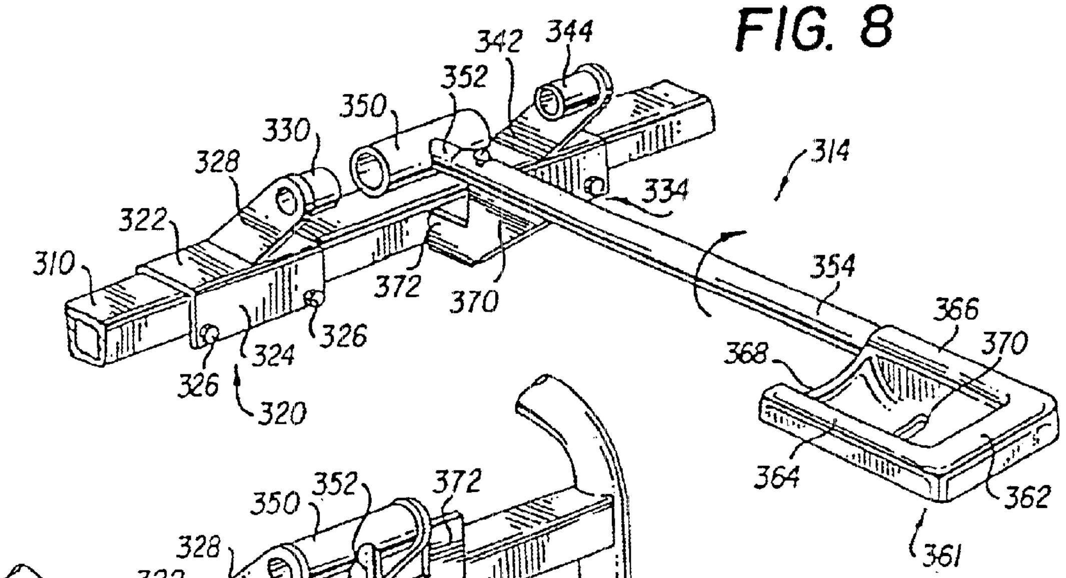
FIG. 8 is a top perspective view of the heel support assembly of the wheelchair in its raised position with the pivotal support means for the assembly in exploded relationship.
Figure 9:
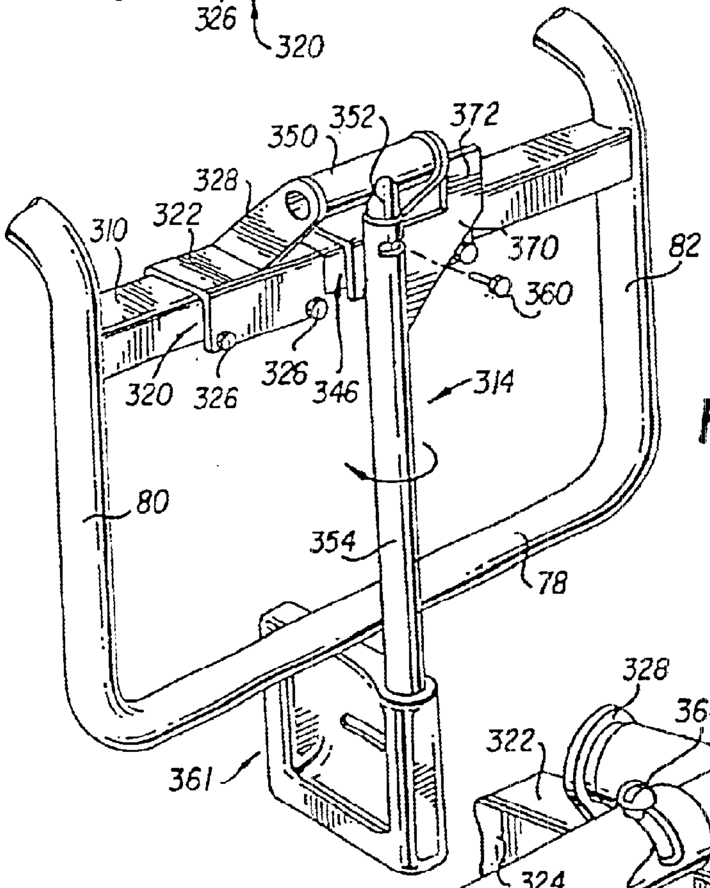
FIG. 9 is a top perspective view of the heel support assembly of the wheelchair in its lowered stored position with the pivotal support means for the assembly in its normal position.

As seen most clearly in FIG. 1 and 2, a support frame member 310 has opposite ends secured by welding to frame portions 80 and 82, frame member 310 being tubular and of generally square cross-section. A heel support assembly 314 is pivotally supported by frame member 310 and is movable between a lowered stored position as shown in FIGS. 1, 2 and 9 and a raised operative position as shown in FIG. 8. The heel support assembly is formed of aluminum or the like except for a plastic heel cup which is contoured to the shape of a heel.

The details of construction of assembly 314 and the manner in which it is pivotally supported on frame member 310 are shown in FIGS; 8–10. A first support member 320 is of generally U-shaped cross-section and includes a top wall 322 and a pair of depending parallel side walls 324. Member 320 defines a space therein which is complementary to the top and side walls of frame member 310. The side walls 324 extend below the bottom wall of frame member 310, and nut and bolt assemblies 326 extend through pairs of aligned holes formed in the bottom portion of side walls 324 so that when the nut and bolt assemblies are tightened, member 320 is clamped in fixed relation on frame member 310. An upwardly extending arm 328 is fixed as by welding to upper wall 322 and is connected to a cylindrical member 330 which extends laterally from arm 328.

Figure 10:
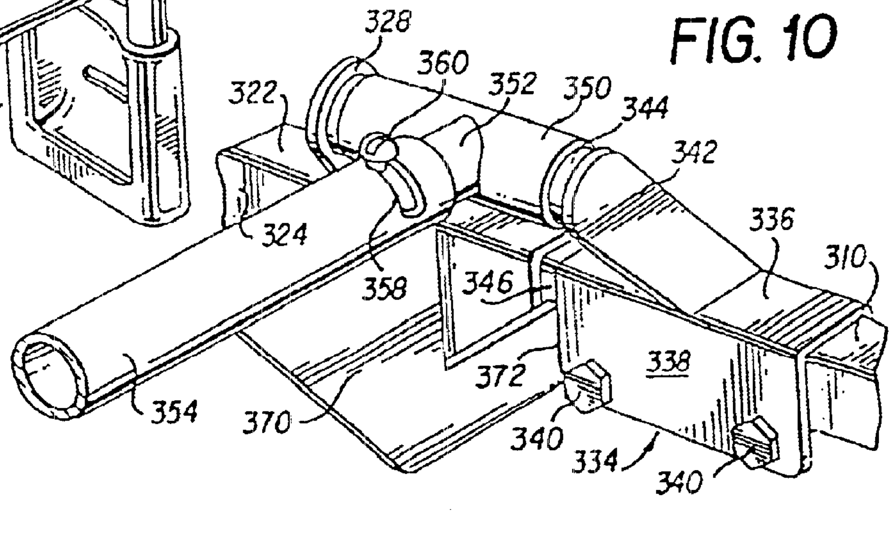
FIG. 10 is a top perspective view showing the manner in which the heel support assembly is retained in raised position.

A second support member 334 is similar to support member 320 and includes an upper wall 336 and a pair of depending parallel side walls 338. Support member 334 is clamped to frame member 310 by nut and bolt assemblies 340. An arm 342 is connected to upper wall 336 and supports a laterally extending cylindrical member 344. It is noted that as seen in FIGS. 9 and 10, when support members 320 and 334 are clamped to frame member 310, the side edges of the two support members are spaced from one another at the front of frame member 310 to define a space 346 for a purpose hereinafter described.

The pivotal support structure for the heel support assembly has been described above. The heel support assembly itself has an inner end which includes a tubular member 350 which has its opposite ends rotatably supported by cylindrical members 330 and 344 which telescope into member 350. The inner end also includes a tubular member 352 fixed as by welding to the outer surface of tubular member 350 and extending at a generally right angle thereto.

The outer end of the heel support assembly includes a tubular member 354 which receives tubular member 352 therein such that tubular member 354 can rotate with respect to tubular member 352. As seen in FIG. 10, tubular member 354 has a is circumferentially extending slot 358 formed therein and extending through an arc of about 90 degrees. A threaded bolt 360 is threaded into a suitable threaded hole formed in tubular member 352 so as to be fixed thereto. The bolt passes through slot 358 so that tubular member 354 may rotate through an angle of about 90 degrees with respect to tubular member 352.

A heel support portion in the form of a heelcup 361 is fixed to the outer end of tubular portion 354. Heelcup 360 if formed of a suitable plastic and is contoured to the shape of a heel. The heelcup includes a front wall 362, a pair of side walls 364, 366 and a front wall 368 of reduced height to facilitate insertion of a user's heel thereinto. A laterally extending projection 370 is fixed as by welding to the outer surface of tubular member 354 and includes an end portion 372 which is adapted to fit in the space 346 to retain the heel support assembly in raised position for supporting the heel of a user.

The heel support assembly is normally stored in the position shown in FIG. 9 wherein bolt 360 is disposed at one end of slot 358 and heelcup 361 extends toward the rear of the wheelchair. When it is desired to utilize the assembly, a user reaches down and swings tubular member 354 upwardly until member 354 is in a generally horizontal position parallel with the floor. Tubular member 354 is then rotated through an angle of about 90 degrees until bolt 360 is disposed at the opposite end of slot 358 as shown in FIGS. 8 and 10 and heelcup 361 is parallel with the floor. Projection 370 will then be in the position as shown in FIGS. 8 and 10 so that end 372 can be received within space 346 when tubular member 354 is lowered slightly and the edge of end 372 engages frame member 310. This causes the heel support assembly to be retained in its raised operative position. The user can then lift one foot at a time into the heelcup to wash his legs and feet.

When it is desired to return the heel support assembly to its stored position, tubular member 354 is lifted slightly to move end 372 of projection 370 out of space 346 whereupon tubular member 354 may be rotated about 90 degrees and the tubular member may be lowered to the stored position shown in FIG. 9.

Figure 11:
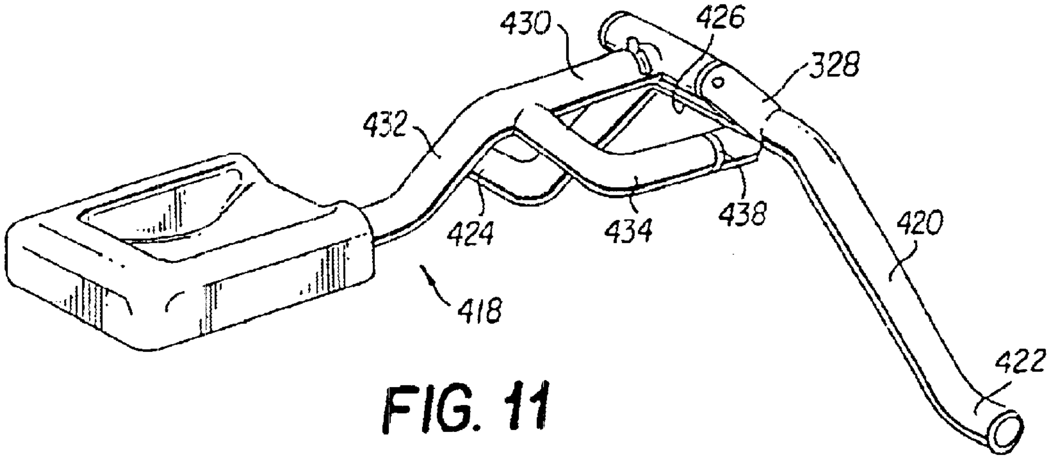
FIG. 11 is a fragmentary view of an alternative embodiment of the heel support.

FIG. 11 illustrates an alternative embodiment of the heel support assembly 418 which employs an offset tube 420 having end portions 422 and 424 secured, for example, as by welding to the depending frame members 82, 84 respectively (see FIG. 9). An elevated central portion 426 supports the bracket 328. A tubular member 430 has an offset central portion 432 as shown. A projecting support 434 is secured at one end to the tubular member 430. The support 434 has a free end 436 having a cylindrical rubber tip 438 which engages a tubing stop 440 welded to the underside of the central offset portion 426 of the tube 420. The heel support operates in a manner similar to the arrangement described in FIGS. 8–10. The various tubing offsets permit convenient clearances. FIG. 12(A–E) shows various positions of the heel support 418 between the raised and lowered positions.

FIG. 14(A–E) are illustrations of an alternative embodiment of the invention in which the wheelchair has a foldable frame 460 to allow for ease of handling and storage. In accordance with exemplary embodiment, the frame 460 has lateral frame members 462 and 464 which are secured by upper (horizontal) an lower (vertical) hinges 466 and 468. The hinges lie in orthogonal planes to thereby allow the frame to move between open folded positions. The hinges include central hinge members joined by a pivot pin 469.

The horizontal hinge 466 has split sleeve end portions 470 and 472 and elongated tab members 473 and 475. Spaced stops 477 fix the position of the hinge 466 with respect to frame members 474, 479 and seat 92. The split sleeve portions engage members 474 of the respective frame portions 462, 464. The tab members 473, 475 are bolted together as shown. The hinge 466 pivots about central hinge 476. A split seat mounting block 478 has one side 480 bolted to the underside of the seat 92 as shown so that the seat pivots upwardly with the hinge as the frame members 474 moves toward each other. The other part 481 of block 478 is secured to tab 473 as shown. The horizontal hinge is secured to the rear portion of the seat as shown. A front hinge 486 is secured to the vertical frame member 484 and to the front of the seat on a side opposite that of the mounting block which is attached to the underside of the seat 92. In the embodiment illustrated, the right half 480 of the split mounting block is secured to the underside of the seat, and the front hinge is 486 is pivotally secured to the sleeve 487 on the frame member 484 at the left side of the forward end of the seat 92 as shown. The right side of the forward end of the seat rests on the top of frame member 486 as illustrated.

Referring to FIGS. 16–18, an important aspect of horizontal hinge 466 is the overcenter characteristic of mounting block 478. As depicted, mounting block 478 has relatively narrower outer ends as compared with the split central portion. In particular, the lower surface of mounting block 478 generally is defined by each of the lower surfaces 483 and 485, respectively of sides 480 and 481, which each extend downwardly and intersect at a central dihedral angle 489, as shown in FIG. 16, when the wheelchair is configured to receive a user. This downwardly extending mounting block configuration forces central hinge 476 to pivot into a position beyond horizontal, shown by the construction line 491. In order for hinge 476, hence the wheelchair, to collapse, hinge 476 must pivot up to, then beyond line 491, as shown in successive FIGS. 17 and 18.

Figure 15A:
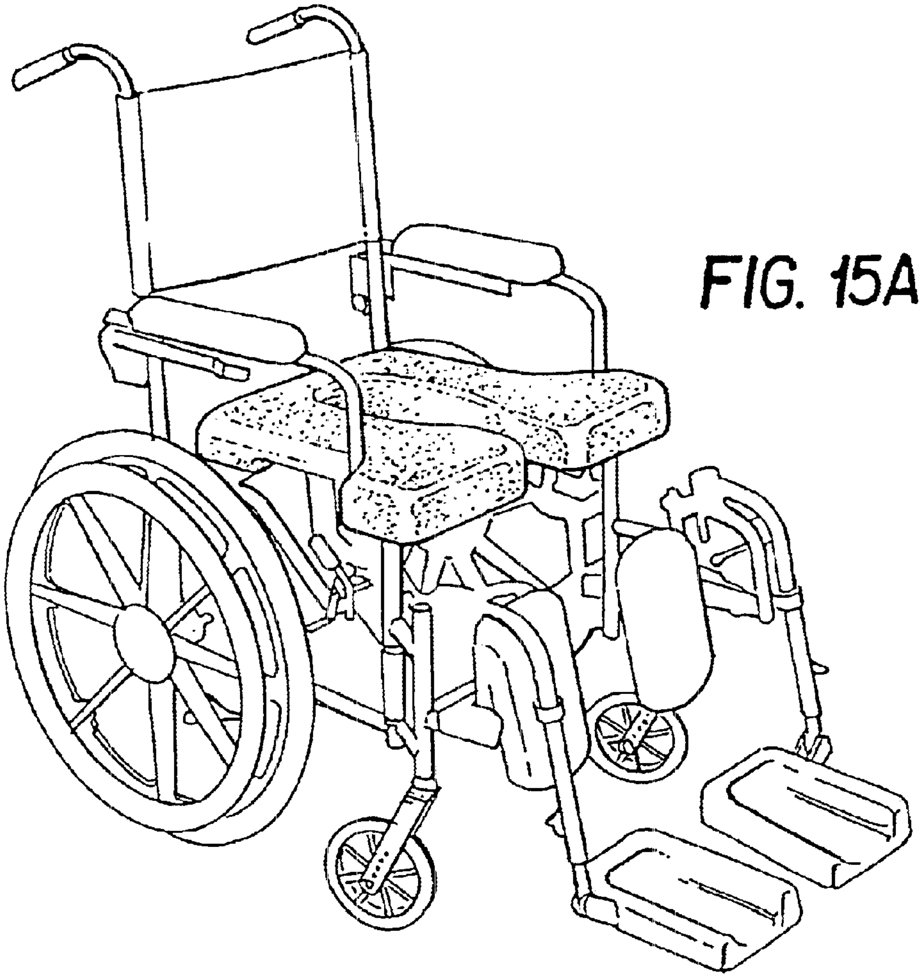
FIGS. 15 A–C are environmental perspective views of the folding frame in various positions.
Figure 15B:
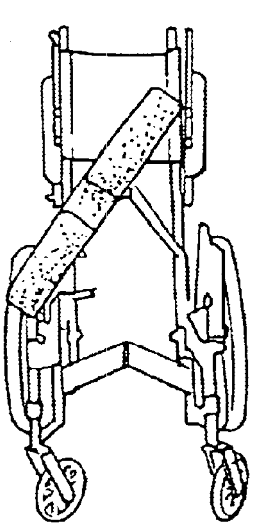
Figure 15C:
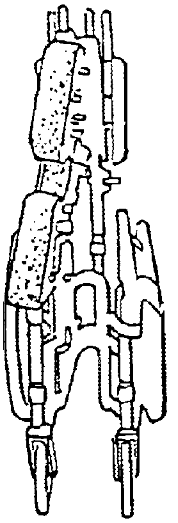

When hinge 476 pivots from the user-ready position, shown in FIG. 16, up to a horizontal position, as shown in FIG. 17, hinge 476 urges apart frame members 474 and 479. Thus, frame members 474 and 479 define distance 493, in FIG. 16, which increases to define distance 496, in FIG. 17. Because hinge 476 not only must overcome the weight of mounting block 478, but also must force frame members 474 and 479 apart, against the typical tensile force caused by back support 28, among other forces, hinge 476 has little if any potential to accidentally or spontaneously pivot such that the wheelchair collapses, as shown in FIGS. 15A–C.

A nylon sleeve 501 is located on the frame as a bearing for the split ring 470. The sleeve has stops at the end for positioning the hinge. The nylon acts as a lubricant to avoid metal/metal contact. A similar arrangement may be employed in the vertical hinge as well.

The vertical hinge 468 is similar in construction to the horizontal hinge as described above. The vertical hinge 480 is secured to the vertical frame members 482 and 488. A split cover plate 486 is secured to the hinge to protect the legs of the patient.

Figure 14B:
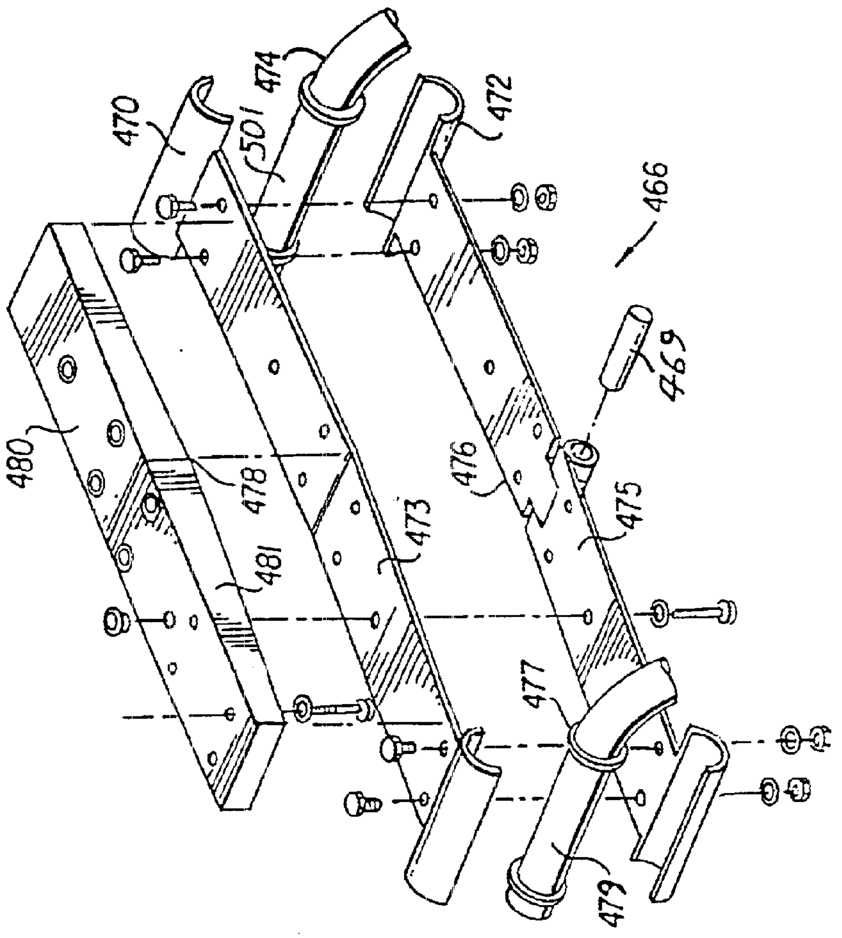
FIGS. 14A–14G are perspective views of an embodiment of the invention employing a foldable frame.
Figure 14A:
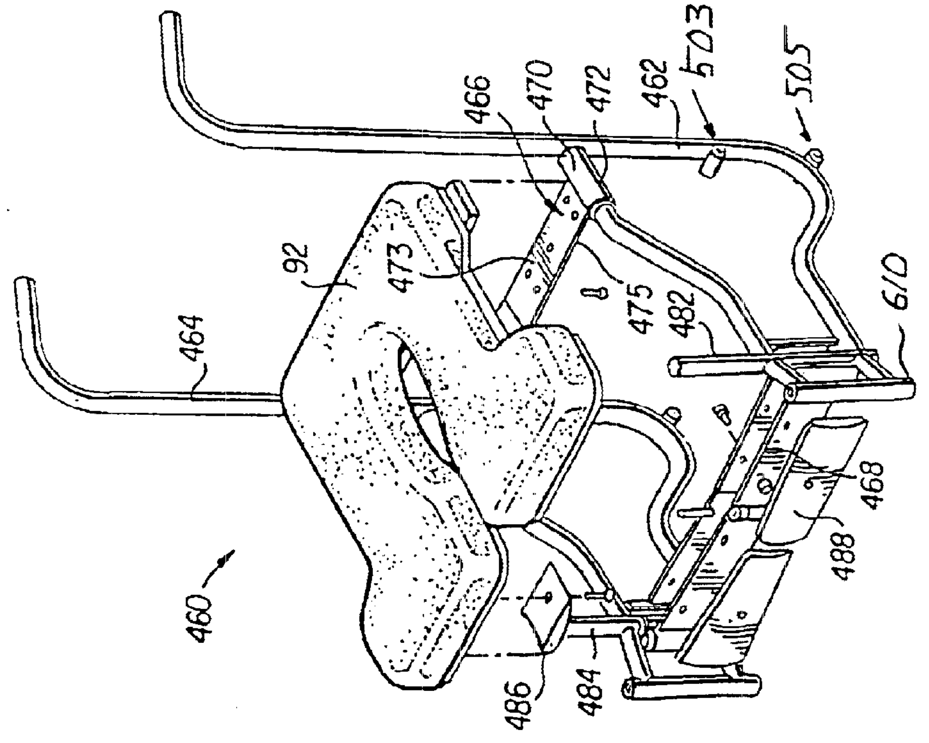
Figure 14D:
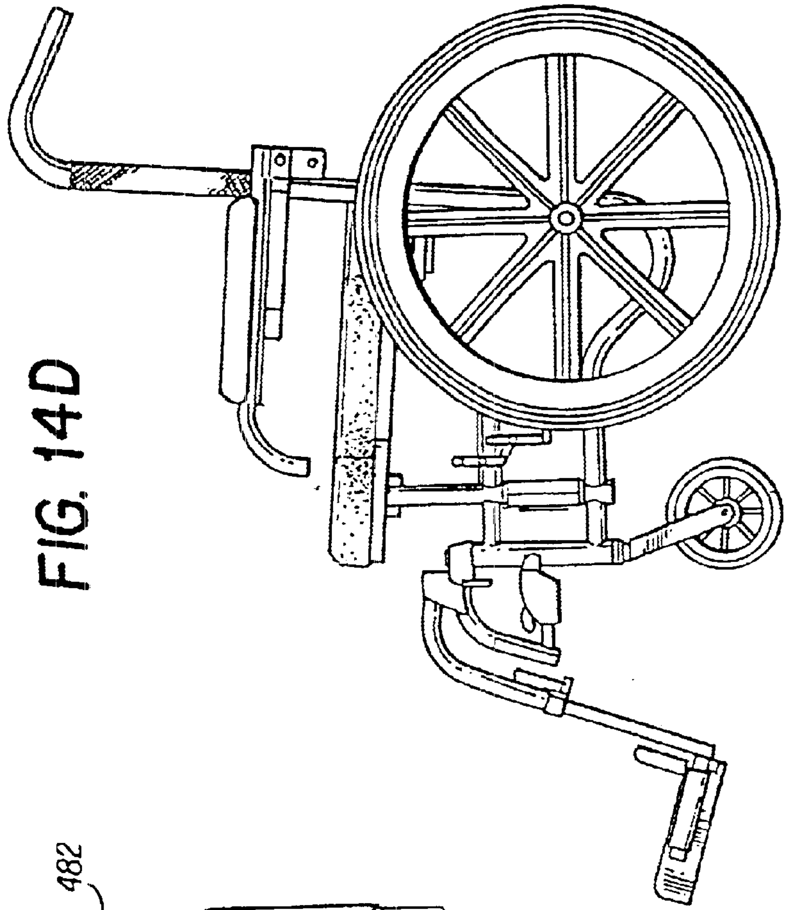
Figure 14C:
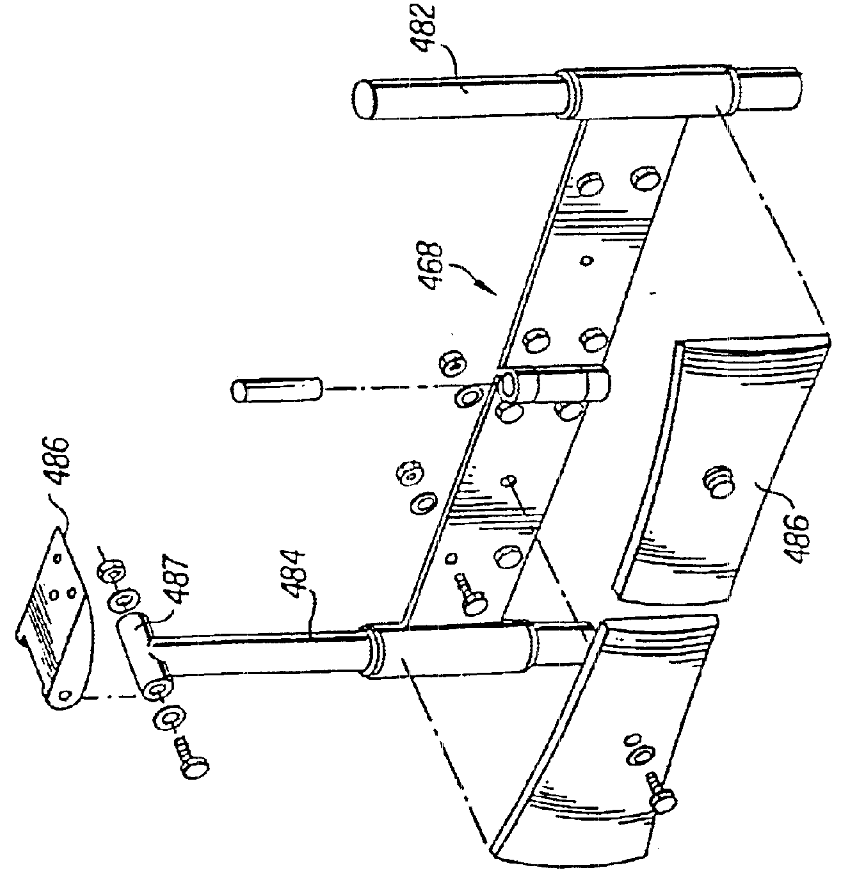
Figure 14E:
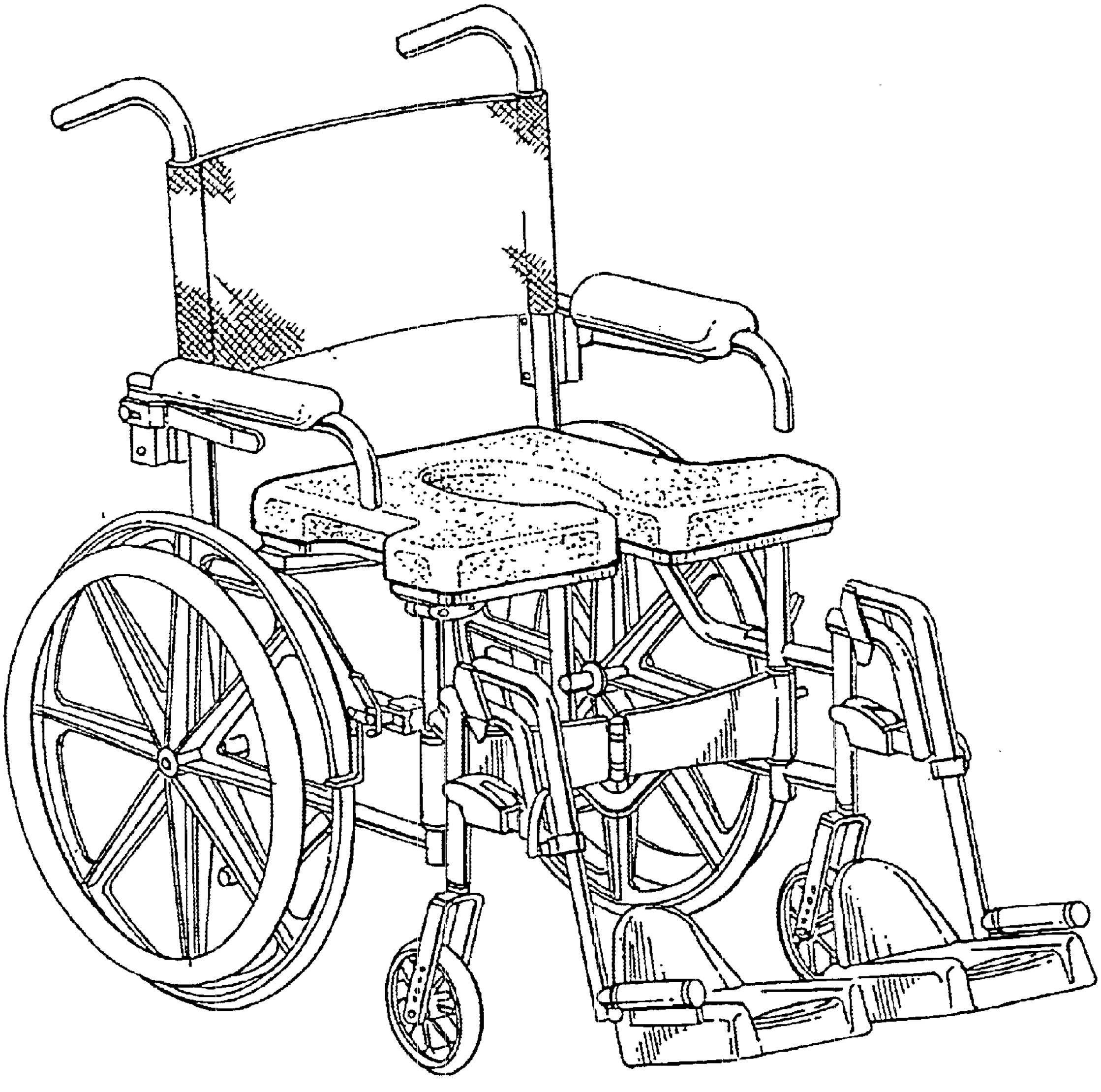
Figure 14G:
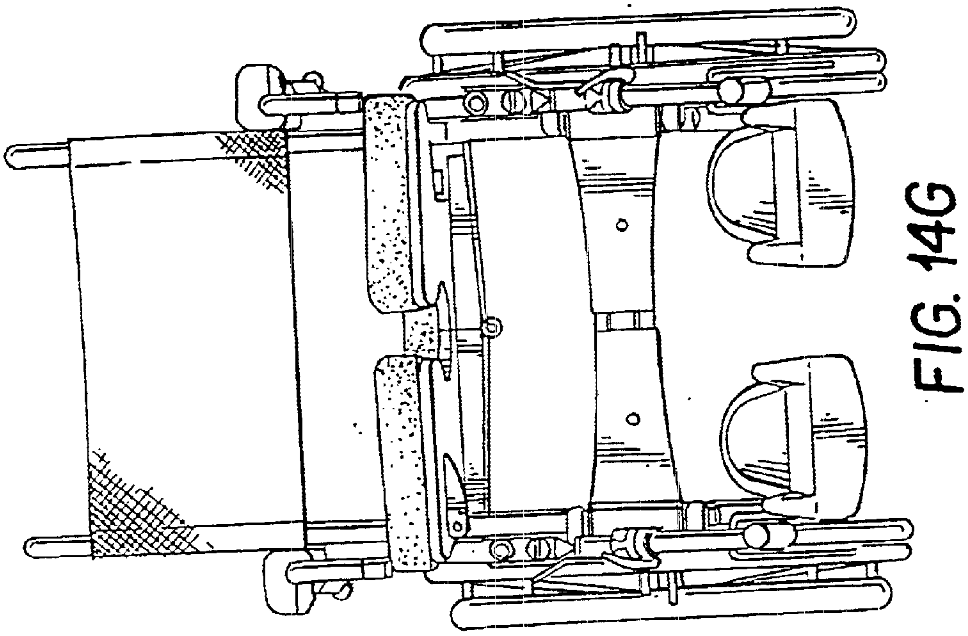
Figure 14F:
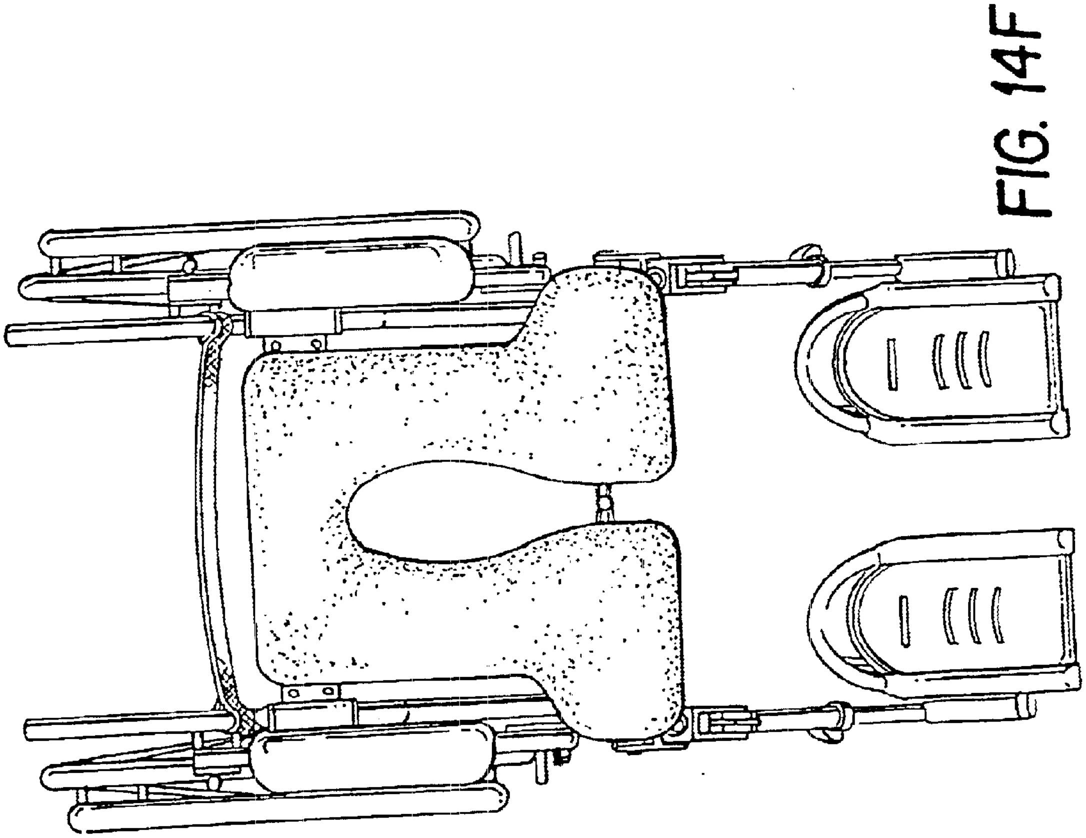
Figure 19:
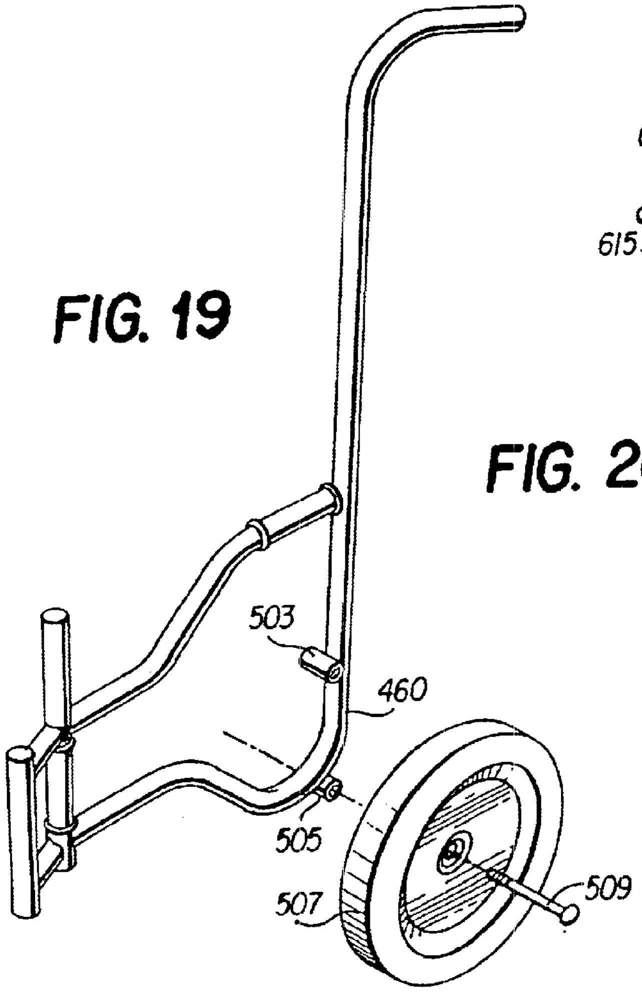
FIG. 19 is a partial top right front perspective view of the frame of FIG. 14A and a rear wheel.

Referring to FIGS. 14A and 19, frame 460 accommodates different sized wheels for supporting a part of a wheelchair, according to user needs. In other words, a portion of a wheelchair, such as the right rear wheel area or the left rear wheel area, may be supported by a large or a small wheel without altering the orientation of frame 460 relative to the surface over which the wheelchair travels. Thus, use of wheels of different sizes does not upset the intended design position of frame 460 or the wheelchair overall. For example, when a user has use of the user's arms, frame 460 provides sleeve 503 for receiving an axle of a conventional driving wheel 44 having a rim 48, as shown in FIG. 1. Where a user does not have use of the user's arms, the user cannot use, thus need not incur the cost of, a driving wheel 44. In this case, the user may prefer to use an equivalent, yet less expensive, small wheel 507. To this end, frame 460 provides sleeve 505 for receiving an axle 509 of wheel 507. Wheel 507, preferably, has a diameter of 28 cm.

FIGS. 15 (A–C) show the wheelchair in open (A) and intermediate (B) and folded (C) stages of storage.

Figure 20:
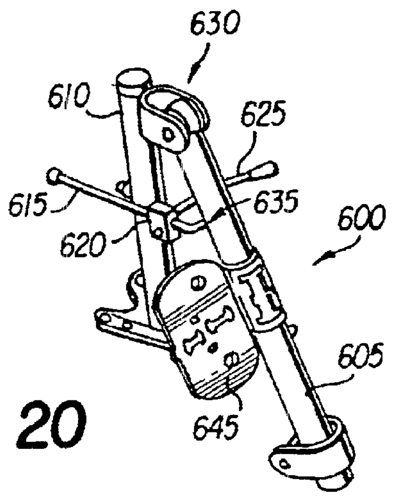
FIG. 20 is a top left front perspective view of a leg lift mechanism according to the invention.

Referring to FIG. 20, to fully exploit hinge 476 and mounting block 478, which renders the wheelchair readily collapsible, the wheelchair may forego a centrally-disposed, specially designated leg lift in favor of a leg lift 600 which is adapted for positioning one or both of the laterally-disposed foot rests, preferably as shown in FIG. 4A. Leg lift 600 includes an extensible support member 605, which is mounted on leg rest support member 610, also shown in FIG. 14A. A rod 615 extending from support member 605 is received in a clutch mechanism 620 which also is mounted on leg rest support member 610. Handle 625 provides for selectably engaging and releasing clutch member 620, thereby allowing rod 615 to slide relative to leg rest support member 610, thus allowing support member 605 to pivot about pivot member 630. As support member 605 pivots relative to leg rest support member 610, the angular relationship between support member 605 and rod 615 changes. Therefore, rod 615 is pivotally mounted on support member 605, such as by having an end thereof received in a sleeve 635. Clutch member 620 provides for infinite angular adjustment of support member 605 relative to leg rest support member 610.

Figure 21:
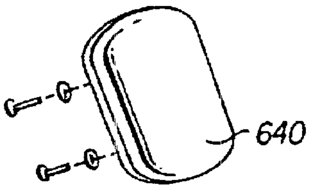
FIG. 21 is a top left front perspective view of a pad mountable on the leg lift mechanism of FIG. 20.

Referring to FIG. 21, leg lift 600 also includes a pad 640 which may be mounted on a leg rest 645, connected to leg rest support member 610. Pad 640 provides for the user's comfort and may be configured or provided with foam of uniform or diverse durometers that promote hygienic patient contact.

Figure 24:
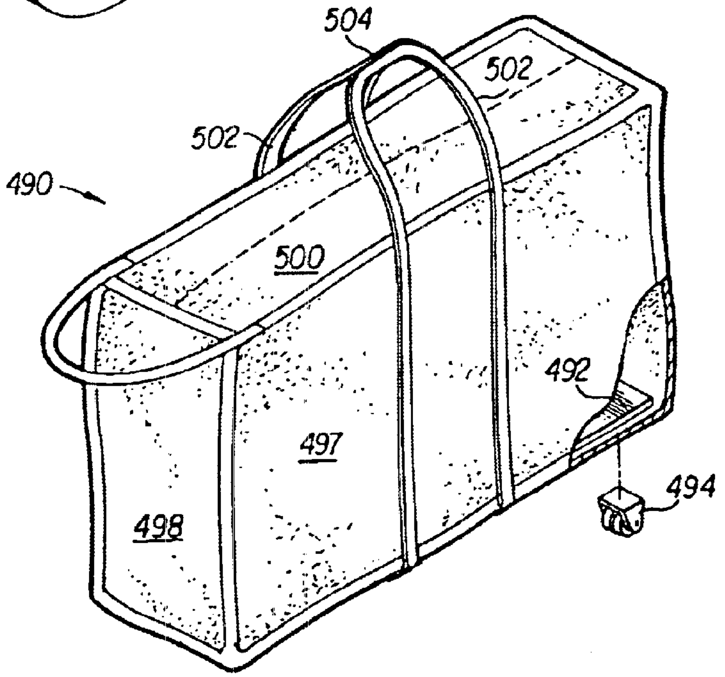
FIGS. 22–24 are respectively a top right front perspective view and a right bottom front perspective view of a carrying case containing a wheelchair, and a top right front perspective view of the carrying case.
Figure 22:
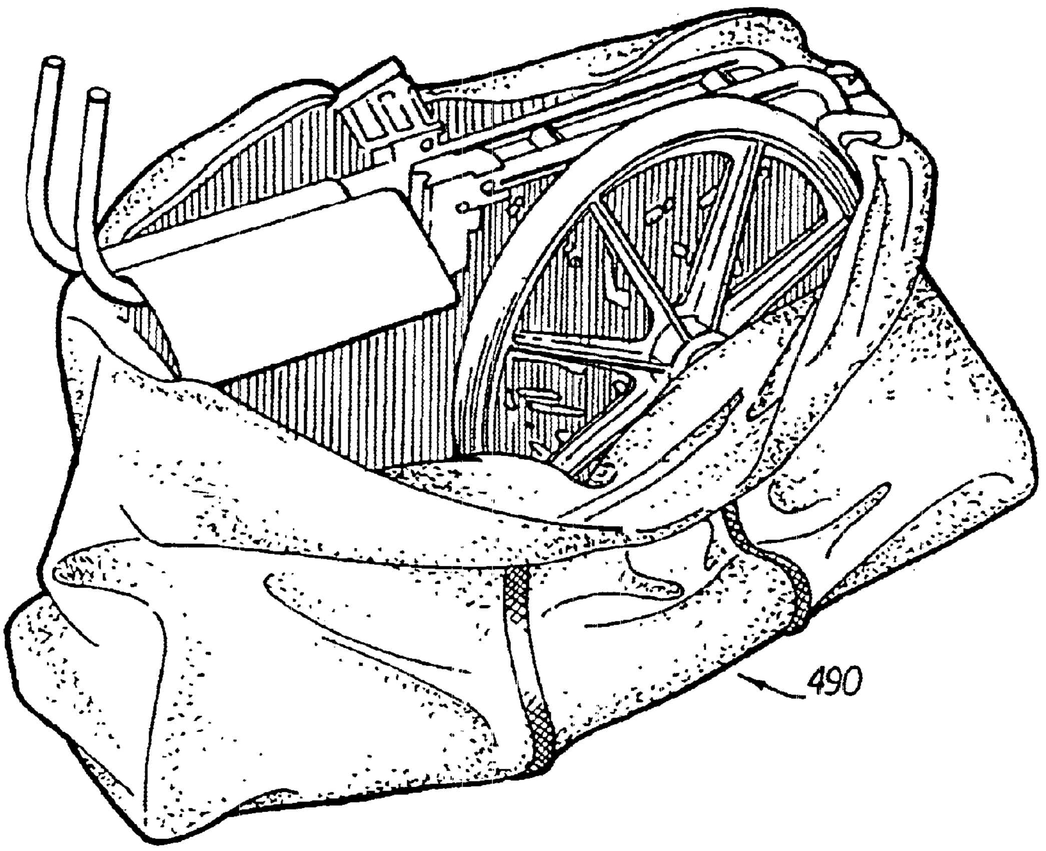
Figure 23:
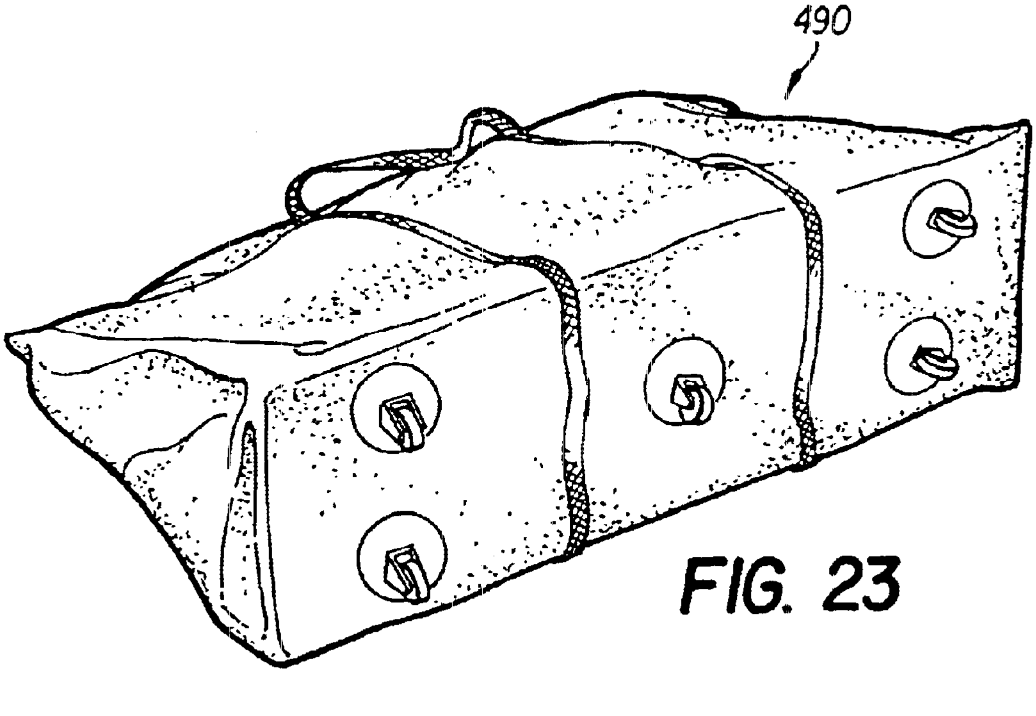

FIGS. 22–24 illustrate a fabric or soft sided carrying bag 490 for the wheelchair. Bag 490 has a rigid base 492 to which is attached a plurality of conventional casters 494 which support the corners and center of base 492. Bag 492 has soft side portions 497, end portions 498 and a zippered top portion 500 which extends from one end of the top to the other. Carrying straps 502 are secured to sides 497 of bag 490 and form handles 504 for carrying and which reinforce the sides of bag 490. Additional reinforcement elements may be provided as desired.

Figure 25:
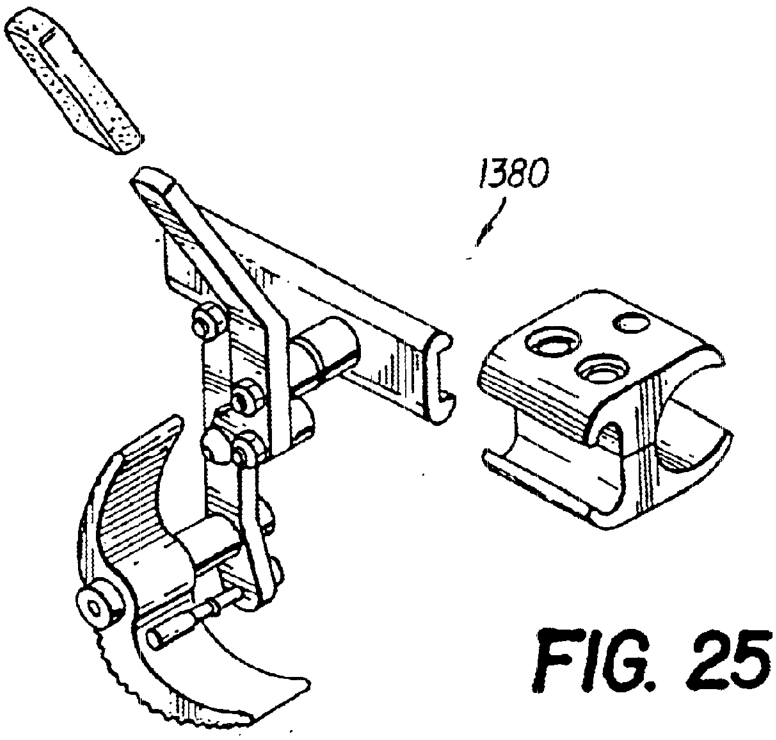
FIGS. 25 and 26 are top left front perspective views of alternative embodiments of a brake mechanism.
Figure 26:
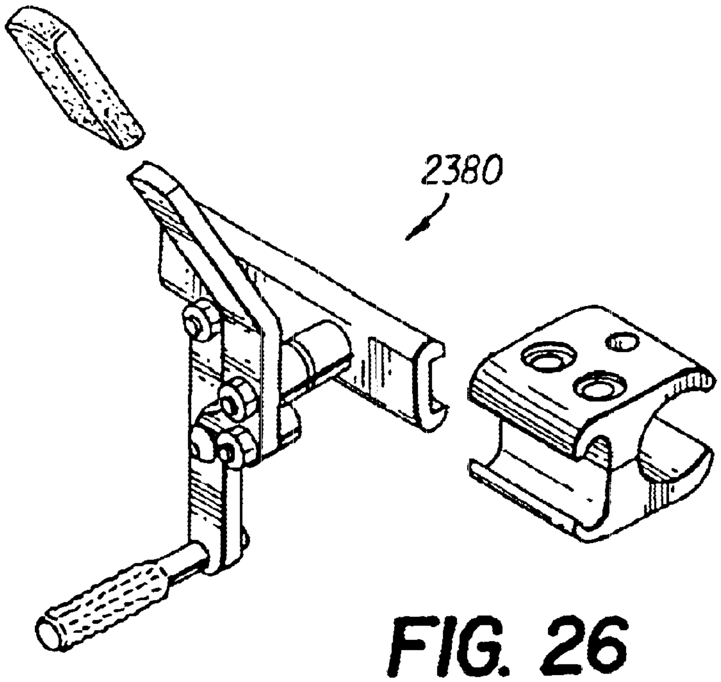

FIGS. 25 and 26 show alternative embodiments 1380 and 2380 of brake mechanism 380 of FIG. 4.

The invention has been described in terms of alternative embodiments. However, arrangements of the various and alternative features of the embodiments are not exclusive and may accommodate any combination of features described consistent with the principles of the invention.

The invention has been described with reference to a preferred embodiment. Obviously, various modifications, alterations and other embodiments will occur to others upon reading and understanding this specification. It is our intention to include all such modifications, alterations and alternate embodiments insofar as they come within the scope of the appended claims or the equivalent thereof.

We claim:

1. A foldable wheelchair comprising:

a foot rest lift including a support configured to pivotally mount on a frame of said wheelchair, said frame including a pair of arm supports and first and second frame members;

means for selectably fixing an orientation of said support relative to said frame; and a hinge mechanism joining at least one of said arm supports to said frame for allowing said arm supports to move between open and folded positions for facilitating lateral transfer of a user onto or off a seat on said wheelchair;

a hinge connecting said first and second frame members; and a block configured to urge said hinge into an over-center position, said block including first and second sides each including inner and outer ends, said outer end of each side being disposed adjacent a respective frame member, said inner ends being generally thicker than said outer ends so as to urge said hinge into the over-center position.

2. A foldable wheelchair according to claim 1, wherein said means for selectably fixing comprises:

a clutch configured to mount on the frame; and a positioning rod extending from said support which is engageable by said clutch.

3. A foldable wheelchair according to claim 1, wherein said support is articulable between a rest position, in which a user's leg generally depends downwardly, and a lift position, in which the user's leg is raised.

4. A foldable wheelchair according to claim 1, further comprising a pad, configured to mount on the frame and support the user's leg when said foot rest lift defines a rest position.

5. A foldable wheelchair comprising:

a first frame member pivotally mounted on a second frame member by means of a hinge interposed between said first and second frame members, said hinge including first and second split sleeves for connecting said hinge to each of said frame members and a block configured to urge said hinge into an over-center position, said block including first and second sides each including inner and outer ends, said outer end of each side being disposed adjacent a respective frame member, said inner ends being generally thicker than said outer ends so as to urge said hinge into the over-center position, wherein a portion of said first and second frame members including a self-lubricating nylon, said self-lubricating nylon portion of each of said frame members being disposed between said first and second split sleeves.

6. A foldable wheelchair comprising:

a hinge connecting a first frame member and a second frame member; and a block configured to urge said hinge into an over-center position, said block including first and second sides each including inner and outer ends, said outer end of each side being disposed adjacent a respective frame member, said inner ends being generally thicker than said outer ends so as to urge said hinge into the over-center position.

7. A foldable wheelchair according to claim 6, wherein said block is configured to position the first frame member relative to the second frame member.

8. A foldable wheelchair according to claim 6, wherein:

said block is articulable between a collapsed position and an operative position, in which said block defines a first length; and when said locking member is articulated into a predetermined position intermediate of the operative position and the collapsed position, said block defines a second length greater than the first length.

9. A foldable wheelchair according to claim 6, wherein said block is oriented so that when a user is received by said wheelchair the user's weight urges said block to urge the hinge into the over-center position.

10. A foldable wheelchair according to claim 6, wherein:

the hinge has a first segment hingedly connected to a second segment;

said block is articulable between a collapsed position and an operative position;

said first side of said block having a first surface configured to mount on the first segment; and said second side of said block having a second surface configured to mount on the second segment;

wherein, when said block is articulated into the operative position, said first surface and said second surface are not coplanar.

11. A foldable wheelchair according to claim 10, wherein when said block is articulated into the operative position, said inner ends mate.

12. A foldable wheelchair according to claim 6, further comprising:

a frame including a pair of arm supports; and a hinge mechanism joining at least one of said arm supports to said frame for allowing said arm supports to move between open and folded positions for facilitating lateral transfer of a user onto or off a seat on said wheelchair.

13. A foldable wheelchair comprising:

a frame adapted to be maintained at a generally predetermined height relative to a generally horizontal surface and including first and second frame members;

a plurality of support points being disposed on said frame generally along a vertical axis relative to the generally horizontal surface;

a hinge connecting said first and second frame members; and a block configured to urge said hinge into an over-center position, said block including first and second sides each including inner and outer ends, said outer end of each side being disposed adjacent a respective frame member, said inner ends being generally thicker than said outer ends so as to urge said hinge into the over-center position, wherein wheels of different sizes, for enabling self-propelling or non-self-propelling operation, being mountable at said respective support points to maintain said frame at the generally predetermined height.

14. A foldable wheelchair according to claim 13, further comprising a plurality of means for mounting a wheel on said frame, each of said means for mounting being adapted for a wheel having a unique size.

15. A foldable wheelchair according to claim 13, further comprising a plurality of sleeves or axles mounted on said frame, each of said sleeves or axles being positioned relative to said frame to accommodate a wheel having a unique size.

* * * * *